(12) United States Patent
Miura

(10) Patent No.: US 9,699,424 B2
(45) Date of Patent: Jul. 4, 2017

(54) PROJECTION DISPLAY UNIT AND DIRECT-VIEW DISPLAY UNIT

(71) Applicant: Sony Corporation, Tokyo (JP)

(72) Inventor: Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 78 days.

(21) Appl. No.: 14/654,909

(22) PCT Filed: Nov. 27, 2013

(86) PCT No.: PCT/JP2013/081858
§ 371 (c)(1),
(2) Date: Jun. 23, 2015

(87) PCT Pub. No.: WO2014/112212
PCT Pub. Date: Jul. 24, 2014

(65) Prior Publication Data
US 2015/0373312 A1    Dec. 24, 2015

(30) Foreign Application Priority Data

Jan. 15, 2013 (JP) ................. 2013-004376
Jun. 27, 2013 (JP) ................. 2013-135041

(51) Int. Cl.
*G02F 1/13363* (2006.01)
*H04N 9/31* (2006.01)
(Continued)

(52) U.S. Cl.
CPC ......... *H04N 9/3167* (2013.01); *G02B 27/283* (2013.01); *G02F 1/13363* (2013.01);
(Continued)

(58) Field of Classification Search
CPC ....... G02F 2001/13355; G02F 1/13363; G02B 27/283
See application file for complete search history.

(56) References Cited

U.S. PATENT DOCUMENTS 5,327,270 A * 7/1994 Miyatake ............. G02B 27/283
349/9

5,712,693 A    1/1998 Miyatake et al.
(Continued)

FOREIGN PATENT DOCUMENTS

| CN | 101398600 A | 4/2009 |
|---|---|---|
| CN | 102436074 A | 5/2012 |

(Continued)

OTHER PUBLICATIONS

U.S. Appl. No. 11/455,629, filed Jun. 19, 2006, Yukawa.
(Continued)

*Primary Examiner* — Kendrick Hsu
(74) *Attorney, Agent, or Firm* — Wolf, Greenfield & Sacks, P.C.

(57) ABSTRACT

A projection display unit includes: an illumination optical system including one or more light sources; a reflective liquid crystal device that generates image light by modulating light from the illumination optical system, based on an input image signal; a polarizing beam splitter disposed on an optical path between the illumination optical system and the reflective liquid crystal device; a polarization compensation device disposed on an optical path between the polarizing beam splitter and the reflective liquid crystal device, and the polarization compensation device that provides a phase difference to light incident thereon to change a polarization state of the light; and a projection optical system that projects image light generated by the reflective liquid crystal device and then being incident thereon through an optical path, the optical path passing through the polarization compensation device and the polarizing beam splitter. The polarization compensation device has a first surface and a second surface that faces each other along an optical axis, and provides a phase difference between absolute values at light incidence from the first surface and at light incidence from the second surface, the absolute values being opposite in polarity to each other and being substantially equal to each other.

13 Claims, 23 Drawing Sheets

(51) Int. Cl.
*G02B 27/28* (2006.01)
*G03B 21/20* (2006.01)
*G03B 33/12* (2006.01)
*G02F 1/1335* (2006.01)

(52) U.S. Cl.
CPC ... *G02F 1/133528* (2013.01); *G03B 21/2013* (2013.01); *G03B 21/2033* (2013.01); *G03B 21/2073* (2013.01); *G03B 33/12* (2013.01); *H04N 9/3111* (2013.01); *H04N 9/3161* (2013.01); *G02F 2001/13355* (2013.01); *G02F 2203/12* (2013.01)

(56) References Cited

U.S. PATENT DOCUMENTS

| | | |
|---|---|---|
| 2007/0008858 A1 | 1/2007 | Yukawa |
| 2008/0002555 A1 | 1/2008 | Hayasaka et al. |
| 2009/0086112 A1 | 4/2009 | Kaida et al. |
| 2012/0075588 A1* | 3/2012 | Suga .................... G02B 27/283 353/20 |
| 2012/0293751 A1 | 11/2012 | Matsushima et al. |
| 2014/0307005 A1 | 10/2014 | Kita |
| 2014/0320753 A1 | 10/2014 | Aikoh |

FOREIGN PATENT DOCUMENTS

| | | |
|---|---|---|
| JP | 10-26756 A | 1/1998 |
| JP | 2009-075460 A | 4/2009 |
| JP | 2009-086164 A | 4/2009 |
| JP | 2010-048903 A | 3/2010 |
| JP | 2011-128634 A | 6/2011 |

OTHER PUBLICATIONS

U.S. Appl. No. 11/809,594, filed Jun. 1, 2007, Hayasaka et al.
U.S. Appl. No. 13/460,964, filed May 1, 2012, Matsushima et al.
U.S. Appl. No. 14/221,311, filed Mar. 21, 2014, Kita.
U.S. Appl. No. 14/249,968, filed Apr. 10, 2014, Aikoh.

* cited by examiner (A)

(B)

(A)

| | EXAMPLE 1 | EXAMPLE 2 | EXAMPLE 3 | COMPARATIVE EXAMPLE 2 |
|---|---|---|---|---|
| TILT ANGLE $\theta s$ (TILT ANGLE $\theta f$) | $\theta s=2.6°$ | $\theta s=2.6°$ | $\theta s=93.2°$ ($\theta f=3.2°$) | $\theta s=2.6°$ |
| IN-PLANE PHASE DIFFERENCE RO(G) | ≈14° (≈20nm) | ≈90° (≈140nm) | ≈90° (≈140nm) | ≈90° (≈140nm) |
| SYMMETRY OF PHASE DIFFERENCE WITH RESPECT TO INCIDENT DIRECTION | SYMMETRY | SYMMETRY | SYMMETRY | ASYMMETRY |
| NORMALIZED CONTRAST | 1.8 | 8.7 | 3.6 | 0.5 |
| EFFECT | △ | ◎ | ○ | × |

(B)

|  | EXAMPLE 4 | EXAMPLE 5 | EXAMPLE 6 | COMPARATIVE EXAMPLE 3 |
|---|---|---|---|---|
| TILT ANGLE $\theta$s (TILI ANGLE $\theta$f) | $\theta$s=6.2° | $\theta$s=2.2° | $\theta$s=92.8° ($\theta$f=2.8°) | $\theta$s=43° |
| IN-PLANE PHASE DIFFERENCE R0(G) | ≈14° (≈20nm) | ≈90° (≈140nm) | ≈90° (≈140nm) | ≈90° (≈140nm) |
| SYMMETRY OF PHASE DIFFERENCE WITH RESPECT TO INCIDENT DIRECTION | SYMMETRY | SYMMETRY | SYMMETRY | ASYMMETRY |
| NORMALIZED CONTRAST | 1.7 | 7.2 | 3.0 | 0.5 |
| EFFECT | △ | ◎ | ○ | × |

PROJECTION DISPLAY UNIT AND DIRECT-VIEW DISPLAY UNIT

TECHNICAL FIELD

The present disclosure relates to a projection display unit and a direct-view display unit each of which uses a reflective liquid crystal device as a spatial modulating device.

BACKGROUND ART

In recent years, projectors (projection display units) configured to project an image onto a screen are widely used not only in offices but also in households. The projectors modulate light from a light source with use of a light valve to generate image light, and project the image light onto a screen to thereby perform display (for example, refer to PTLs 1 and 2). Recently, palm-sized ultra-compact projectors, mobile phones with a built-in ultra-compact projector, and the like are being introduced.

CITATION LIST

Patent Literature

PTL 1: Japanese Unexamined Patent Application Publication No. 2011-128634
PTL 2: Japanese Unexamined Patent Application Publication No. 2010-48903

SUMMARY OF INVENTION

In the above-described projectors, in general, an improvement in contrast is demanded to improve display image quality. More specifically, for example, in a case where a reflective liquid crystal device is used as a spatial modulating device, to improve contrast, it is desired to suppress leakage light from an optical system in black display, thereby reducing luminance in black display.

Therefore, is it desirable to provide a projection display and a direct-view display unit each of which is capable of suppressing leakage light in black display to improve contrast.

A projection display unit according to an embodiment of the present disclosure includes: an illumination optical system including one or more light sources; a reflective liquid crystal device that generates image light by modulating light from the illumination optical system, based on an input image signal; a polarizing beam splitter disposed on an optical path between the illumination optical system and the reflective liquid crystal device; a polarization compensation device disposed on an optical path between the polarizing beam splitter and the reflective liquid crystal device, and the polarization compensation device that provides a phase difference to light incident thereon to change a polarization state of the light; and a projection optical system that projects image light generated by the reflective liquid crystal device and then being incident thereon through an optical path, the optical path passing through the polarization compensation device and the polarizing beam splitter. The above-described polarization compensation device has a first surface and a second surface that faces each other along an optical axis, and provides a phase difference between absolute values at light incidence from the first surface and at light incidence from the second surface, the absolute values being opposite in polarity to each other and being substantially equal to each other.

A direct-view display unit according to an embodiment of the present disclosure includes: an illumination optical system including one or more light sources; a reflective liquid crystal device that generates image light by modulating light from the illumination optical system, based on an input image signal; a polarizing beam splitter disposed on an optical path between the illumination optical system and the reflective liquid crystal device; a polarization compensation device disposed on an optical path between the polarizing beam splitter and the reflective liquid crystal device, and the polarization compensation device that provides a phase difference to light incident thereon to change a polarization state of the light; a projection optical system that projects image light generated by the reflective liquid crystal device and then being incident thereon through an optical path, the optical path passing through the polarization compensation device and the polarizing beam splitter; and a transmissive screen that displays the image light projected from the projection optical system. The above-described polarization compensation device has a first surface and a second surface that faces each other along an optical axis, and provides a phase difference between absolute values at light incidence from the first surface and at light incidence from the second surface, the absolute values being opposite in polarity to each other and being substantially equal to each other.

In the projection display unit and the direct-view display unit according to the embodiments of the present disclosure, light emitted from the light source in the illumination optical system is polarized and separated by the polarizing beam splitter, and polarized light of the light enters the reflective liquid crystal device through the polarization compensation device. Moreover, this incident light is modulated by the reflective liquid crystal device, based on an image signal to generate image light, and this image light enters the projection optical system through the polarization compensation device and the polarizing beam splitter. Then, this incident light is projected by the projection optical system to display an image, based on the image signal. In this case, the polarization compensation device has the first surface and the second surface that face each other along the optical axis, and provides a phase difference between the absolute values that are opposite in polarity to each other and are substantially equal to each other at light incidence from the first surface and at light incidence from the second surface. Therefore, for example, even if obliquely incident light onto the polarizing beam splitter (a polarization separation surface) is present or some liquid crystal molecules remain tilted in the reflective liquid crystal device, leakage light from the polarizing beam splitter to the projection optical system in black display caused by elliptically-polarized light generated by such obliquely incident light or the remaining tilted liquid crystal molecules is suppressed.

According to the projection display unit and the direct-view display unit of the embodiment of the present disclosure, the polarization compensation device provides a phase difference between the absolute values that are opposite in polarity to each other and are substantially equal to each other at light incidence from the first surface and at light incidence from the second surface; therefore, leakage light in black display caused by elliptically-polarized light generated by obliquely incident light or remaining tilted liquid crystal molecules is allowed to be suppressed. Therefore, contrast is allowed to be improved, and an improvement in display image quality is allowed to be achieved.

BRIEF DESCRIPTION OF DRAWINGS

FIG. 27 is a diagram illustrating a schematic configuration of a rear-projection display unit using any of the projectors according to the embodiment, Modification Examples 1 and 2, and the like.

DESCRIPTION OF EMBODIMENTS

Some embodiments of the present disclosure will be described in detail below referring to the accompanying drawings. It is to be noted that description will be given in the following order.
1. Embodiment (An example of a projector including a plurality of light sources in an illumination optical system)
2. Modification Examples of Embodiment
Modification Example 1 (An example in which positions of a reflective liquid crystal device and a polarization compensation device are changed)
Modification Example 2 (An example in which only one light source is provided in the illumination optical system)
3. Other Modification Examples (Combinations of any of the embodiment and the respective modification examples, and the like, an application example to a rear-projection display unit, and the like)

Embodiment

Figure 1:
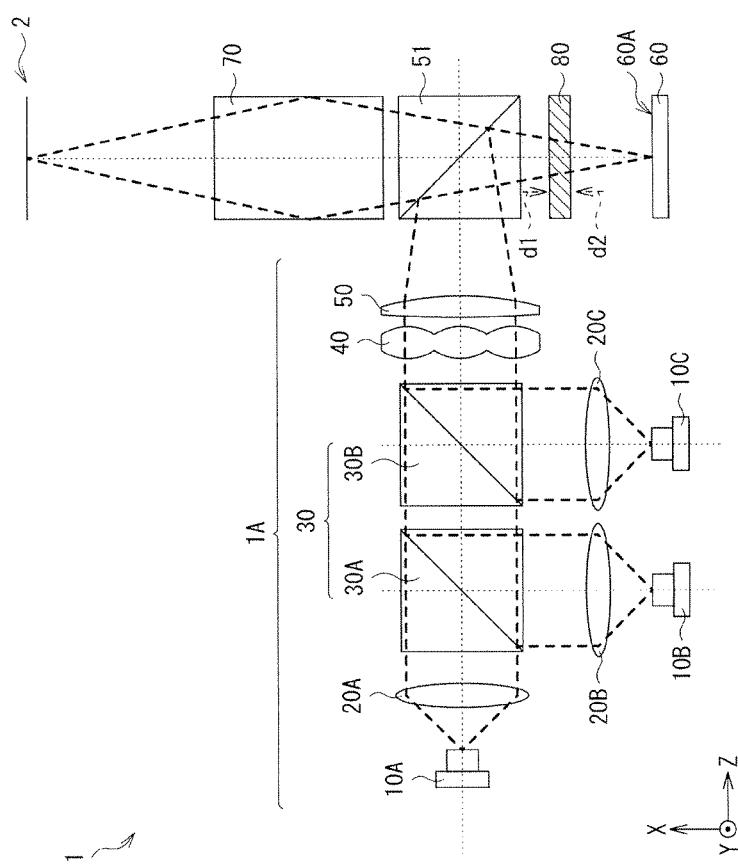
FIG. 1 is a diagram illustrating a schematic configuration of a projector according to an embodiment of the present invention.

[Entire Configuration of Projector 1]
FIG. 1 illustrates a schematic configuration of a projection display unit (a projector 1) according to an embodiment of the present disclosure with an optical path (indicated by a thick broken line) and an optical axis (indicated by a thin broken line). This projector 1 is configured to display an image by projecting image light generated based on an input image signal onto a reflective screen 2.

It is to be noted that, in FIG. 1, typically, a Y axis is directed toward a vertical direction and an X axis is directed toward a horizontal direction; however, on the contrary, the Y axis may be directed toward the horizontal direction and the X axis may be directed toward the vertical direction. For convenience sake, in the following description, the Y axis and the X axis are directed toward the vertical direction and the horizontal direction, respectively. Moreover, in the following description, a "transverse direction" indicates an X-axis direction, and a "longitudinal direction" indicates a Y-axis direction.

The projector 1 may include, for example, an illumination optical system 1A and a display optical system. This display optical system includes a reflective liquid crystal device 50 as a spatial modulating device, a polarizing beam splitter 51, a polarization compensation device 80, and a projection optical system 70.

[Configuration of Illumination Optical System 1A]
The illumination optical system 1A is configured to provide a light flux that is applied to an illumination region 60A (an illuminated surface) of the reflective liquid crystal device 60. It is to be noted that, as necessary, any optical device may be included in a region where light of the illumination optical system 1A passes. For example, a filter that attenuates light, other than visible light, from the illumination optical system 1A, or the like may be included in the region where light of the illumination optical system 1A passes.

For example, as illustrated in FIG. 1, the illumination optical system 1A may include light sources 10A, 10B, and 10C, coupling lenses (directivity angle changing devices) 20A, 20B, and 20C, an optical path combining device 30, an integrator (fly-eye lens) 40, and a condenser lens 50. The optical path combining device 30 is configured to combine light from the light sources 10A, 10B, and 10C, and may be configured of, for example, two dichroic mirrors 30A and 30B. The integrator 40 is configured to uniformize an illuminance distribution (luminance distribution) of light in the illumination region 60A, and is configured of one fly-eye lens in this case. However, the integrator 40 may be configured of a pair of fly-eye lenses. It is to be noted that an f-number in an integrator optical system configured of this integrator 40 and the condenser lens 50 may be, for example, 4 or more. Moreover, in a case where such an integrator optical system is used, a configuration in which another integrator optical system is included in a predetermined illumination region may be possible to further improve uniformity. In this case, an f-number of the integrator optical system in a second stage may be, for example, 4.

The coupling lens 20A, the optical path combining device 30, the integrator 40, and the condenser lens 50 are arranged in this order from the light source 10A side on an optical axis of the light source 10A. An optical axis of the light source 10B is orthogonal to the optical axis of the light source 10A on the dichroic mirror 30A, and the coupling lens 20B and the dichroic mirror 30A are arranged in this order from the light source 10B side on the optical axis of this light source 10B. An optical axis of the light source 10C is orthogonal to the optical axis of the light source 10A on the dichroic mirror 30B, and the coupling lens 20C and the dichroic mirror 30B are arranged in this order from the light source 10C side on the optical axis of this light source 10C.

(Light Sources 10A, 10B, and 10C: In a Case where a Chip 11A is a Top Emission Type Device)

Figure 2:
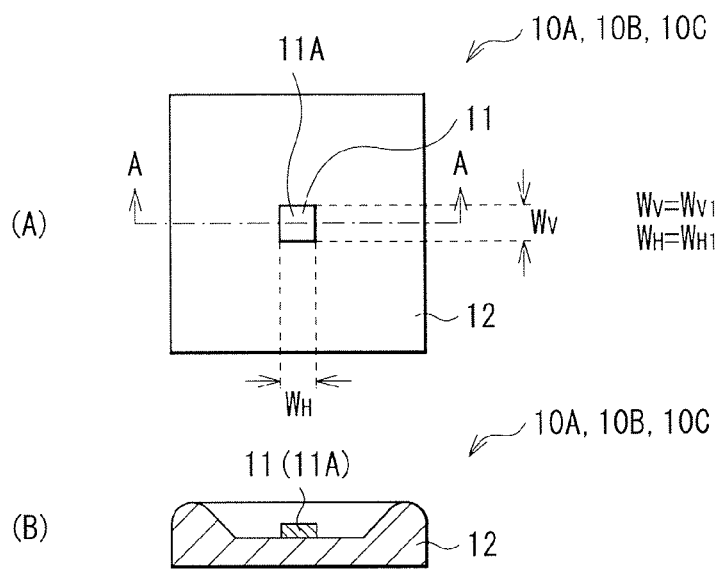
FIG. 2 is a diagram illustrating an example of a top configuration and a sectional configuration in a case where a chip in a light source illustrated in FIG. 1 is a top emission type device.
Figure 3:
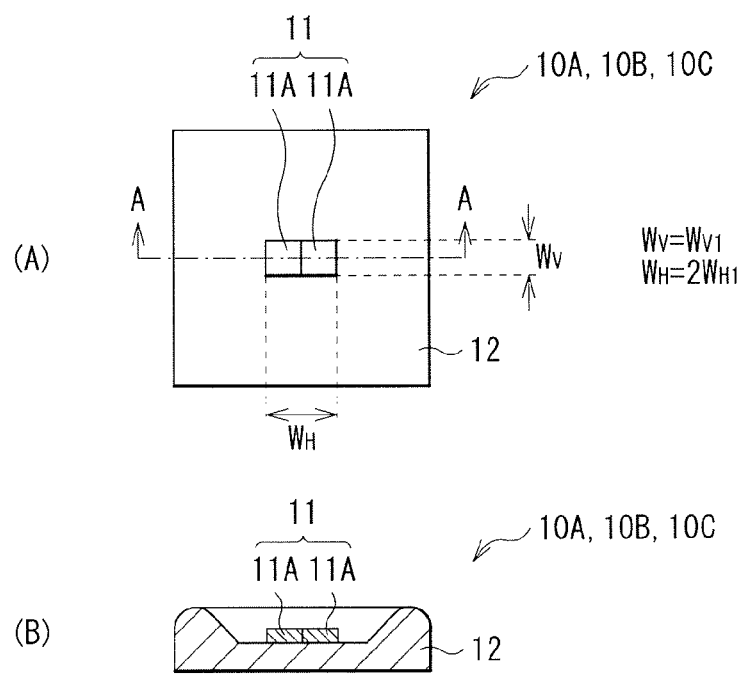
FIG. 3 is a diagram illustrating another example of the top configuration and the sectional configuration in the case where the chip in the light source illustrated in FIG. 1 is the top emission type device.
Figure 4:
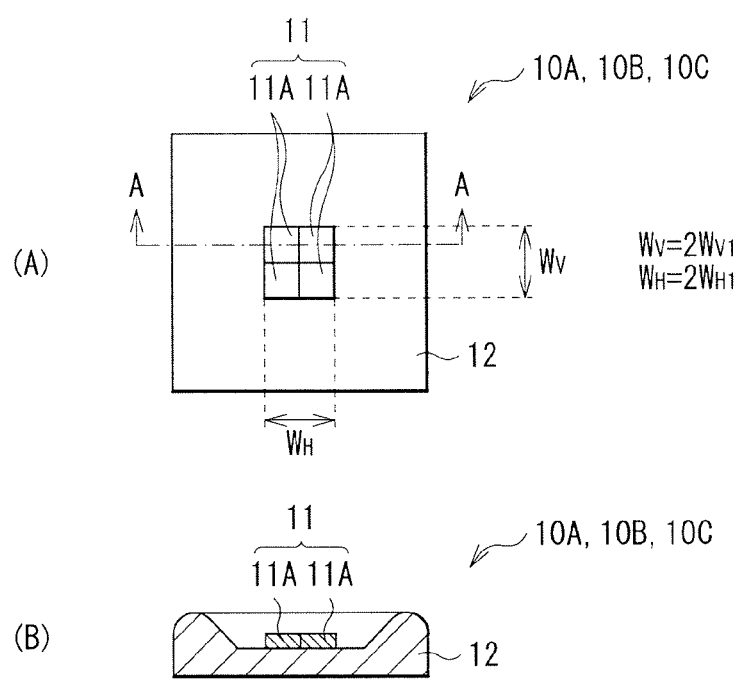
FIG. 4 is a diagram illustrating another example of the top configuration and the sectional configuration in the case where the chip in the light source illustrated in FIG. 1 is the top emission type device.

For example, as illustrated in FIGS. 2(A) and (B) to 4(A) and (B), each of the light sources 10A, 10B, and 10C may include a solid-state light-emitting device 11 and a package 12 that supports the solid-state light-emitting device 11 (a base configured to mount the solid-state light-emitting device 11 thereon). In other words, in this case, each of the light sources 10A, 10B, and 10C is formed in a manner of a package in which the solid-state light-emitting device 11 is supported on the base. The solid-state light-emitting device 11 is configured to emit light from a light emission region including one or more dot-shaped or non-dot-shaped light-emitting spots. For example, as illustrated in FIGS. 2(A) and (B), the solid-state light-emitting device 11 may include a single chip 11A that emits light in a predetermined wavelength range, or as illustrated in FIGS. 3(A) and (B), and 5(A) and (B), the solid-state light-emitting device 11 may be configured of a plurality of chips 11A that emit light in a same wavelength range or light in wavelength ranges different from one another. In the case where the solid-state light-emitting device 11 is configured of a plurality of chips 11A, for example, these chips 11A may be arranged, for example, in a line in the transverse direction as illustrated in FIGS. 3(A) and (B), or in a grid-like pattern in the transverse direction and the longitudinal direction as illustrated in FIGS. 4(A) and (B). The number of chips 11A included in the solid-state light-emitting device 11 may be different in each of the light sources 10A, 10B, and 10C, or may be the same in all of the light sources 10A, 10B, and 10C.

In the case where the solid-state light-emitting device 11 is configured of the single chip 11A, for example, as illustrated in FIG. 2(A), a size ($W_V \times W_H$) of the solid-state light-emitting device 11 is equal to a size ($W_{V1} \times W_{H1}$) of the single chip 11A. On the other hand, in the case where the solid-state light-emitting device 11 is configured of a plurality of chips 11A, for example, as illustrated in FIGS. 3(A) and 4(A), the size of the solid-state light-emitting device 11 is equal to the size of a package into which all of the chips 11A are gathered. In the case where the plurality of chips 11A are arranged in a line in the transverse direction, the size ($W_V \times W_H$) of the solid-state light-emitting device 11 is equal to $W_{V1} \times 2W_{H1}$ in an example in FIG. 3(A). Moreover, in the case where the plurality of chips 11A are arranged in a grid-like pattern in the transverse direction and the longitudinal direction, the size ($W_V \times W_H$) of the solid-state light-emitting device 11 is equal to $2W_{V1} \times 2W_{H1}$ in an example in FIG. 4(A).

Each of the chips 11A is configured of a light-emitting diode (LED), an organic EL light-emitting diode (OLED), or a laser diode (LD). Herein, desirably, one or more of the chips 11A included in the light sources 10A, 10B, and 10C may be configured of an LD. It is to be noted that, in this case, the chips 11A other than the chip(s) 11A configured of the LD may be configured of any of an LED, an OLED, and an LD.

The chips 11A included in the light sources 10A, 10B, and 10C may be configured to emit light in wavelength ranges different in each of the light sources 10A, 10B, and 10C, for example. The chip 11A included in the light source 10A may be configured to emit, for example, light (blue light) in a wavelength of about 400 nm to about 500 nm both inclusive (for example, about 450 nm). The chip 11A included in the light source 10B may be configured to emit, for example, light (green light) in a wavelength of about 500 nm to about 600 nm both inclusive (for example, about 530 nm). The chip 11A included in the light source 10C may be configured to emit, for example, light (red light) in a wavelength of about 600 nm to about 700 nm both inclusive (for example, about 640 nm). It is to be noted that the chip 11A included in the light source 10A may be configured to emit light (green light or red light) other than blue light. Moreover, the chip 11A included in the light source 10B may be configured to emit light (blue light or red light) other than green light. Further, the chip 11A included in the light source 10C may be configured to emit light (green light or blue light) other than red light.

Figure 5:
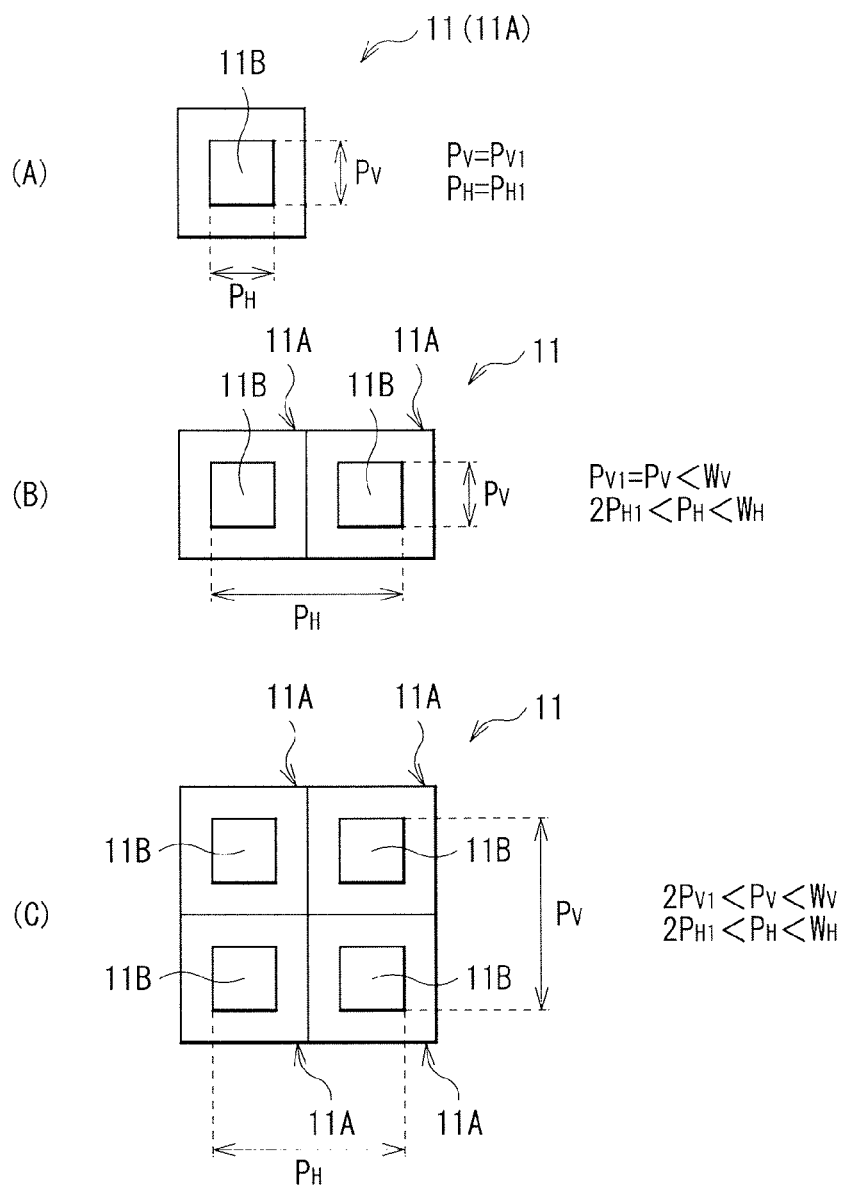
FIG. 5 is a diagram illustrating an example of a light emission spot in the case where the chip in the light source illustrated in FIG. 1 is the top emission type device.

For example, as illustrated in FIGS. 2(A) and (B) to FIGS. 5(A), (B), and (C), each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In a case where the chip 11A is configured of an LED or an OLED, the light-emitting spot 11B has a non-dot (planar) shape, but in a case where the chip 11A is configured of an LD, the light-emitting spot 11B has a smaller dot shape than the light-emitting spot 11B of the LED or the OLED.

In the case where the solid-state light-emitting device 11 is configured of a single chip 11A, for example, as illustrated in FIG. 5(A), the number of light-emitting spots 11B is one.

However, as will be described later, in a case where the solid-state light-emitting device 11 has a monolithic configuration, the number of light-emitting spots 11B is two or more, and this applies to the following description. On the other hand, in the case where the solid-state light-emitting device 11 is configured of a plurality of chips 11A, for example, as illustrated in FIGS. 5(B) and (C), the number of the light-emitting spots 11B is equal to the number of chips 11A (however, in the case where, as described above, the solid-state light-emitting device 11 has a monolithic configuration, the number of light-emitting spots 11B is larger than the number of chips 11A). Herein, in the case where the solid-state light-emitting device 11 is configured of the single chip 11A, a size ($P_V \times P_H$) of the light emission region of the solid-state light-emitting device 11 is equal to the size ($P_{V1} \times P_{H1}$) of the light-emitting spot 11B (except for the case where the solid-state light-emitting device 11 has a monolithic configuration, as described above). On the other hand, in the case where the solid-state light-emitting device 11 is configured of a plurality of chips 11A, the size ($P_V \times P_H$) of the light emission region of the solid-state light-emitting device 11 is equal to a size of a smallest possible enclosure containing the light-emitting spots 11B of all of the chips 11A. In the case where the plurality of chips 11A are arranged in a line in the transverse direction, in an example in FIG. 5(B), the size ($P_V \times P_H$) of the light emission region is larger than $P_{V1} \times 2P_{H1}$, and is smaller than $W_V \times W_H$. Moreover, in the case where the plurality of chips 11A are arranged in a grid-like pattern in the transverse direction and the longitudinal direction, the size ($P_V \times P_H$) of the light emission region is larger than $2P_{V1} \times 2P_{H1}$, and is smaller than $W_V \times W_H$ in an example in FIG. 5(C).

(Light Sources 10A, 10B, and 10C: In a Case where the Chip 11 is an Edge-Emission Type Device)

Figure 6:
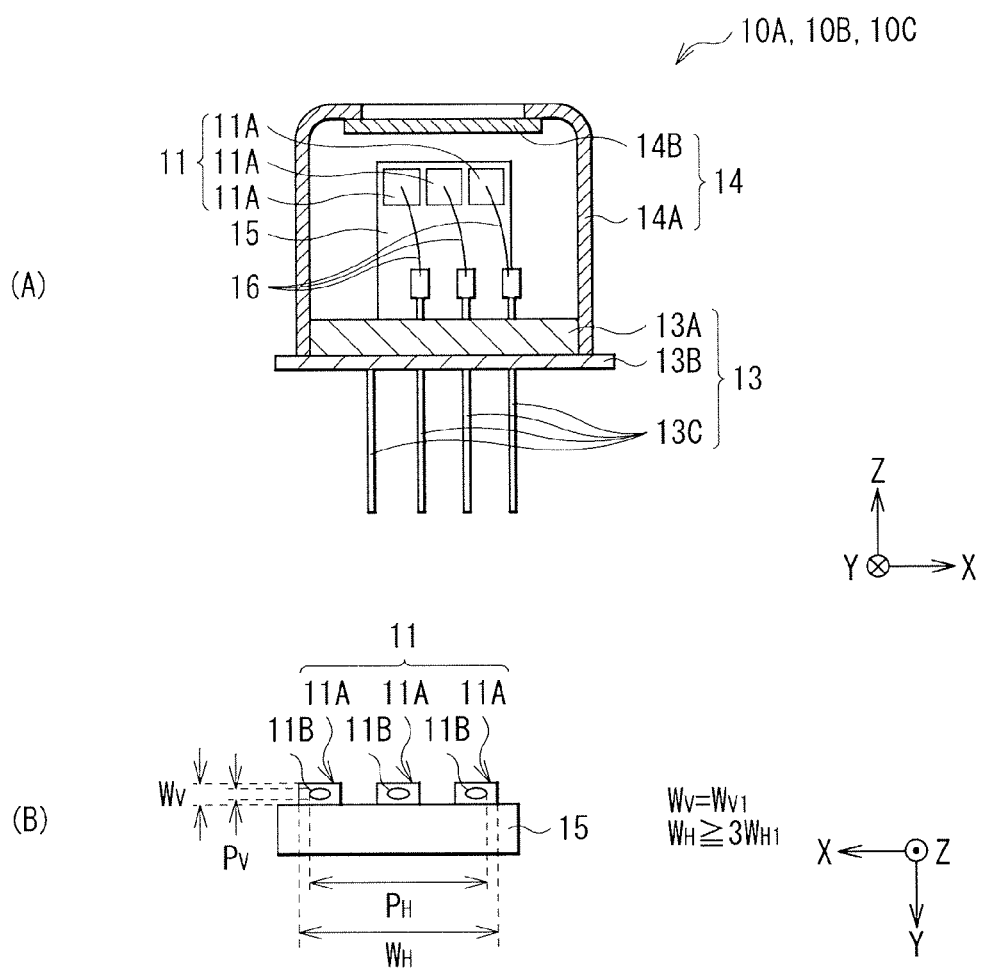
FIG. 6 is a diagram illustrating an example of a sectional configuration in a case where the chip in the light source illustrated in FIG. 1 is an edge emission type device, and a solid-state light-emitting device when viewed from a light emission surface side thereof.
Figure 7:
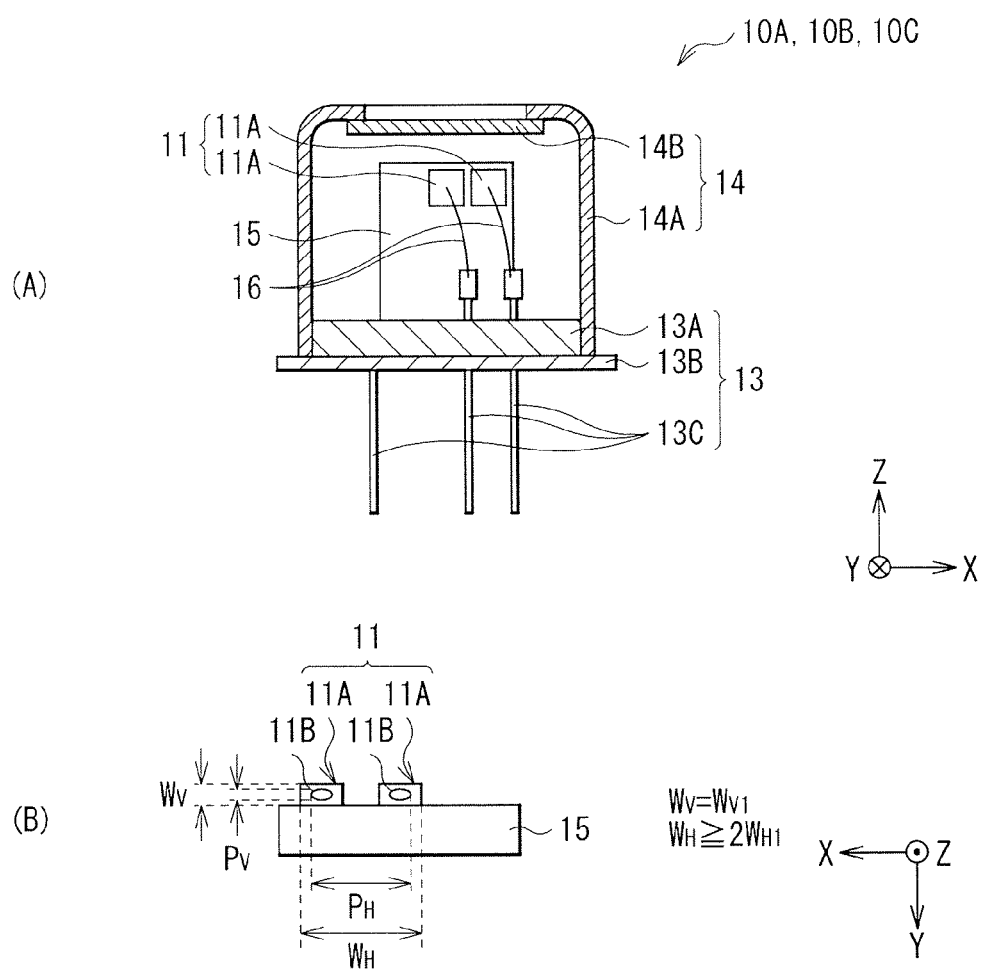
FIG. 7 is a diagram illustrating another example of the sectional configuration in the case where the chip in the light source illustrated in FIG. 1 is the edge emission type device, and the solid-state light-emitting device when viewed from the light emission surface thereof.

In FIGS. 2(A) and (B) to 5(A) and (B), the case where the chips 11A are top-emission type devices is described as an example; however, the chips 11A may be edge-emission type devices as will be described later. In this case, for example, as illustrated in FIGS. 6(A) and (B) to FIGS. 11(A), (B), and (C), each of the light sources 10A, 10B, and 10C is of a can type in which the solid-state light-emitting device 11 configured of one or more edge-emission type chips 11A is contained in an inner space enclosed with a stem 13 and a cap 14. In other words, in this case, each of the light sources 10A, 10B, and 10C is formed in a manner of a package incorporating the solid-state light-emitting device 11.

The stem 13 configures, together with the cap 14, a package of each of the light sources 10A, 10B, and 10C, and may include, for example, a supporting substrate 13A that supports a submount 15, an outer frame substrate 13B disposed on a back side of the supporting substrate 13A, and a plurality of connection terminals 13C.

The submount 15 is made of a material having conductivity and thermal dissipation. Each of the supporting substrate 13A and the outer frame substrate 13B is configured of a base having conductivity and heat dissipation in which one or more insulating through holes and one or more conductive through holes are formed. The supporting substrate 13A and the outer frame substrate 13B each may have, for example, a disk shape, and may be laminated to allow central axes (not illustrated) thereof to be superimposed on each other. A diameter of the outer frame substrate 13B is larger than that of the supporting substrate 13A. An outer edge of the outer frame substrate 13B is a ring-shaped flange hanging over in a radiation direction from the central axis of the outer frame substrate 13B in a plane having a normal along the central axis of the outer frame substrate 13B. The flange has a role in determining a reference position when the cap 14 is fit into the supporting substrate 13A in a manufacturing process.

The plurality of connection terminals 13C penetrate through at least the supporting substrate 13A. Respective terminals (hereinafter referred to as terminals α for convenience sake) except for one or more terminals of the plurality of connection terminals 13C are electrically connected to respective electrodes (not illustrated) of the chips 11A. For example, the terminals α protrude long on the outer frame substrate 13B side, and protrude short on the supporting substrate 13A side. Moreover, a terminal (hereinafter referred to as terminal β for convenience sake) other than the above-described terminals α of the plurality of connection terminals 13C is electrically connected to the other electrodes (not illustrated) of all of the chips 11A. For example, the terminal β protrudes long on the outer frame substrate 13B side, and, for example, an end located closer to the supporting substrate 13A of the terminal β is embedded in the supporting substrate 13A. A portion protruding long on the outer frame substrate 13 side of each of the connection terminals 13C may correspond to a portion fit in, for example, a substrate or the like. On the other hand, portions protruding short on the supporting substrate 13A side of the plurality of connection terminals 13C may correspond to portions electrically connected to the respective chips 11A through wires 16. Portions embedded in the supporting substrate 13A of the plurality of connection terminals 13C may correspond to, for example, portions electrically connected to all of the chips 11A through the supporting substrate 13 and the submount 15. The terminals α are supported by the insulating through holes formed in the supporting substrate 13A and the outer frame substrate 13B, and are insulated and separated from the supporting substrate 13A and the outer frame substrate 13B by the through holes. Moreover, the terminals α are insulated and separated from one another by the above-described insulating members. On the other hand, the terminal β is supported by the conductive through holes formed in the supporting substrate 13A and the outer frame substrate 13B, and is electrically connected to the through holes.

The cap 14 is configured to seal the solid-state light-emitting device 11. The cap 14 may have, for example, a cylindrical section 14A having openings in upper and lower ends thereof. The lower end of the cylindrical section 14A may be in contact with, for example, a side surface of the supporting substrate 13A, and the solid-state light-emitting device 11 may be disposed in an inner space of the cylindrical section 14A. The cap 14 has a light transmission window 14B that is so disposed as to block the opening on the upper end of the cylindrical section 14A. The light transmission window 14B is disposed in a position facing a light emission surface of the solid-state light-emitting device 11, and has a function of allowing light output from the solid-state light-emitting device 11 to pass therethrough.

Figure 9:
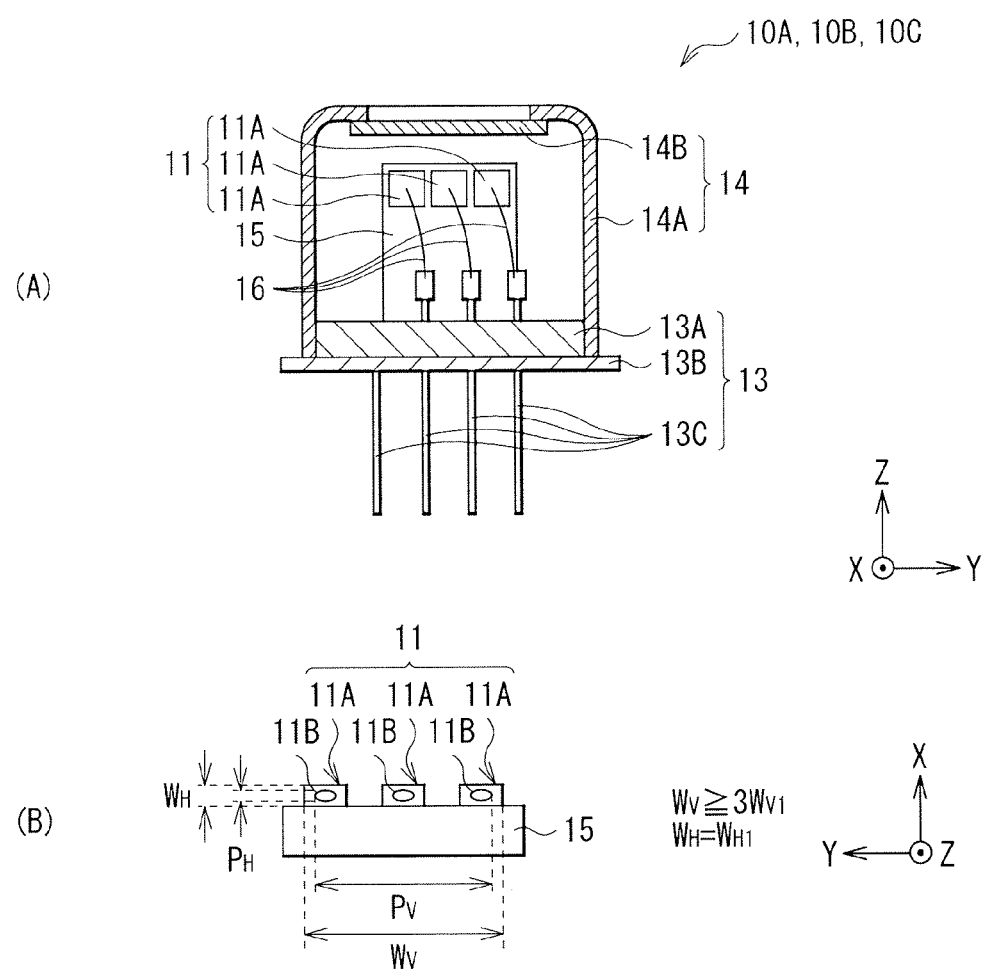
FIG. 9 is a diagram illustrating a configuration example when the light source illustrated in FIG. 6 is rotated by 90° in an XY plane.
Figure 10:
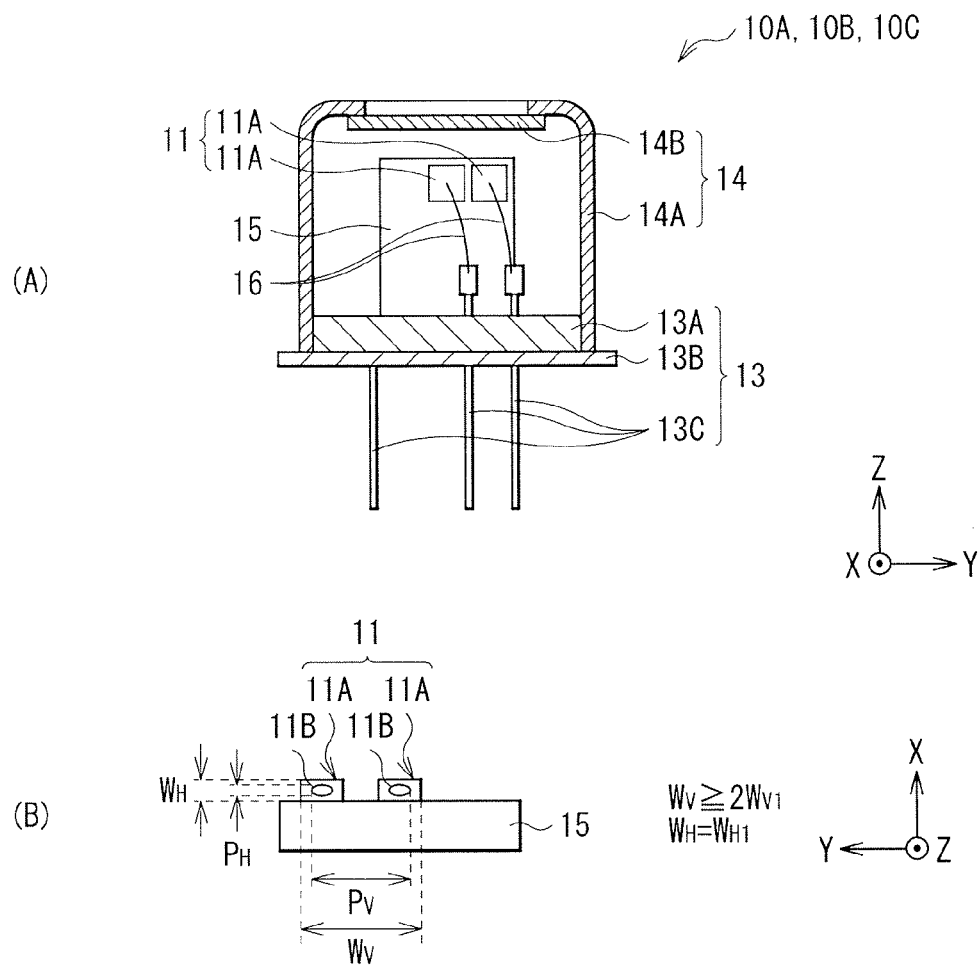
FIG. 10 is a diagram illustrating a configuration example in a case where the light source illustrated in FIG. 7 is rotated by 90° in an XY plane.

Thus, even in the case where the chip 11A is configured of the edge-emission type device, the solid-state light-emitting device 11 emits light from the light emission region including one or more dot-shaped or non-dot-shaped light-emitting spots. The solid-state light-emitting device 11 may include, for example, a single chip 11A that emits light in a predetermined wavelength range, or a plurality of chips 11A that emit light in a same wavelength range or light in wavelength ranges different from one another. In the case where the solid-state light-emitting device 11 is configured of a plurality of chips 11A, for example, these chips 11A may be arranged in a line in the transverse direction as illustrated in FIGS. 6(A), (B), and 7(A) and (B), or may be arranged, for example, in a line in the longitudinal direction as illustrated in FIGS. 9(A) and (B), and 10(A) and (B). The number of chips 11A included in the solid-state light-emitting device 11 may be different in each of the light sources 10A, 10B, and 10C, or may be the same in all of the light sources 10A, 10B, and 10C.

Figure 8:
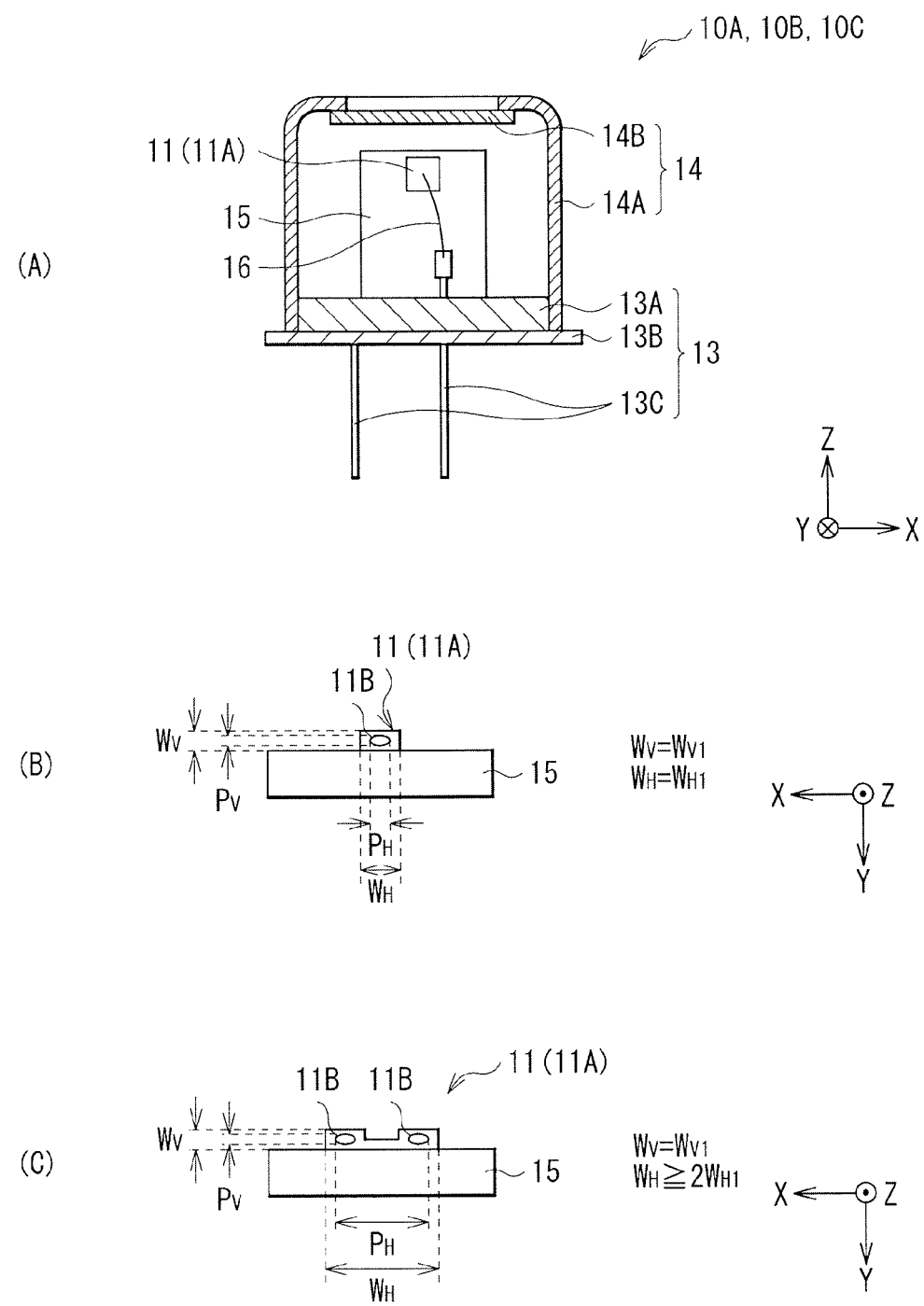
FIG. 8 is a diagram illustrating another example of another example of the sectional configuration in the case where the chip in the light source illustrated in FIG. 1 is the edge emission type device, and the solid-state light-emitting device when viewed from the light emission surface thereof.
Figure 11:
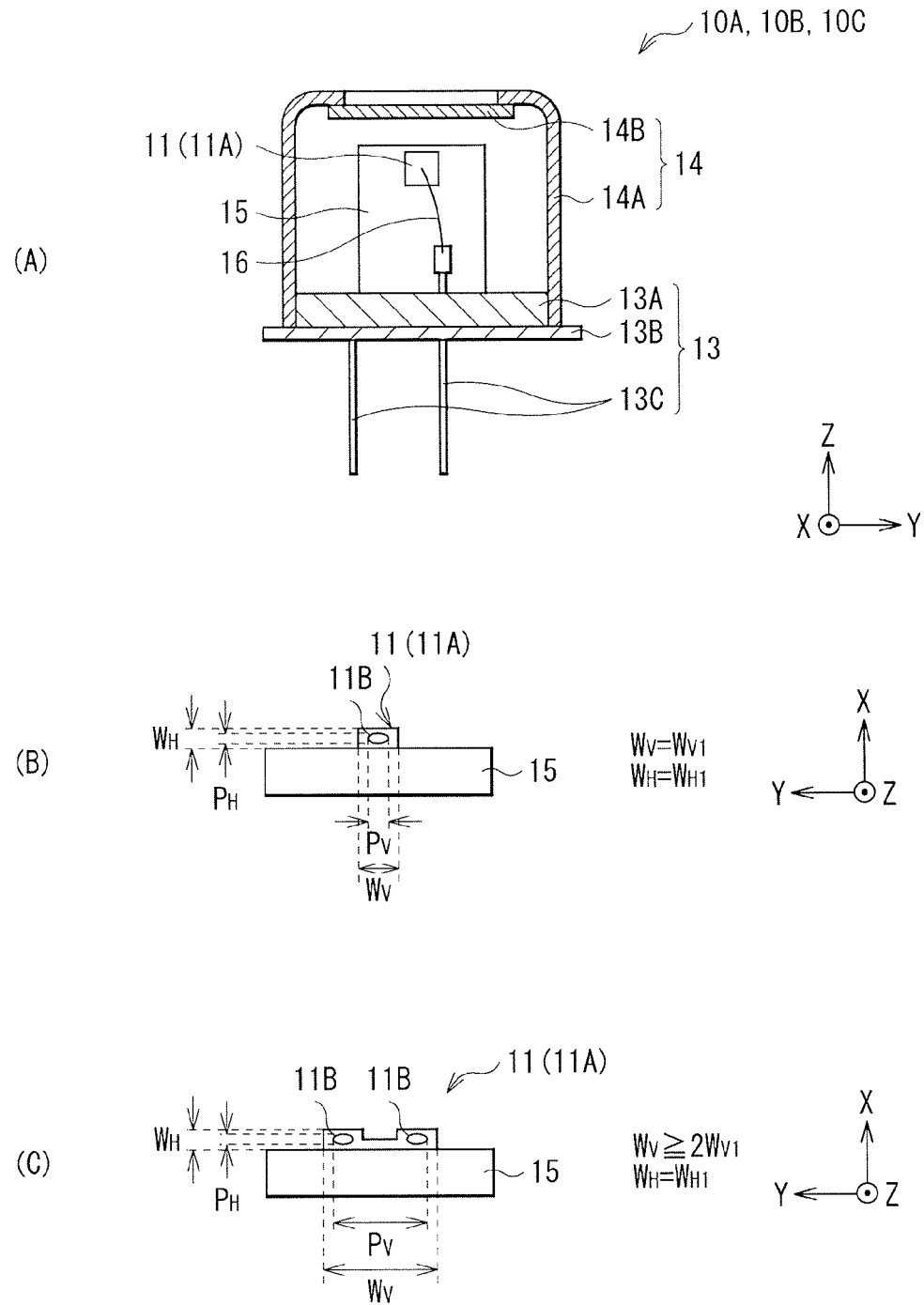
FIG. 11 is a diagram illustrating a configuration example when the light source illustrated in FIG. 8 is rotated by 90° in an XY plane.

In the case where the solid-state light-emitting device 11 is configured of the single chip 11A, for example, as illustrated in FIGS. 8(B) and 11(B), the size ($W_V \times W_H$) of the solid-state light-emitting device 11 is equal to the size ($W_{V1} \times W_{H1}$) of the single chip 11A. However, for example, as illustrated in FIGS. 8(C) and 11(C), in the case where the solid-state light-emitting device 1 has a monolithic configuration, the configuration is as described below, and this applies to the following description. Namely, in an example in FIG. 8(C), the size ($W_V \times W_H$) of the solid-state light-emitting device 11 is larger than $W_{V1} \times 2W_{H1}$, and in an example in FIG. 11(C), the size ($W_V \times W_H$) of the solid-state light-emitting device 11 is larger than $2W_{V1} \times W_{H1}$. On the other hand, in the case where the solid-state light-emitting device 11 is configured of a plurality of chips 11A, for example, as illustrated in FIGS. 6(B), 7(B), 9(B), and 10(B), the size of the solid-state light-emitting device 11 is equal to the size of a package into which all of the chips 11A are gathered. In the case where the plurality of chips 11A are arranged in a line in the transverse direction, the size ($W_V \times W_H$) of the solid-state light-emitting device 11 is larger than $W_{V1} \times 3W_{H1}$ in an example in FIG. 6(B), and is larger than $W_{V1} \times 2W_{H1}$ in an example in FIG. 7(B). Moreover, in the case where the plurality of chips 11A are arranged in a line in the longitudinal direction, for example, the size ($W_V \times W_H$) of the solid-state light-emitting device 11 is larger than $3W_{V1} \times W_{H1}$ in an example in FIG. 9(B), and is larger than $2W_{V1} \times W_{H1}$ in an example in FIG. 10(B).

Each of the chips 11A is configured of an LED, an OLED, or an LD. However, even in this case, as described above, desirably, one or more of the chips 11A included in the light sources 10A, 10B, and 10C may be configured of an LD. Moreover, the chips 11A other than the chip(s) 11A configured of the LD may be configured of any of an LED, an OLED, and an LD.

For example, as illustrated in FIGS. 6(A) and (B) to FIGS. 11(A), (B), and (C), each of the chips 11A has a light-emitting spot 11B with a smaller size ($P_{V1} \times P_{H1}$) than the size ($W_V \times W_H$) of the chip 11A. The light-emitting spot 11B corresponds to a region (a light emission region) from which the chip 11A emits light when a current is injected into the chip 11A to drive the chip 11A. In the case where the chip 11A is configured of an LD, the light-emitting spot 11B has a smaller dot shape than the light-emitting spot 11B of the LED or the OLED.

In the case where the solid-state light-emitting device 11 is configured of a single chip 11A, for example, as illustrated in FIGS. 8(B) and 11(B), the number of light-emitting spots 11B is one. However, for example, as illustrated in FIGS. 8(C) and 11(C), in the case where the solid-state light-emitting device 11 has a monolithic configuration, the number of light-emitting spots 11B is two or more (two in this case), and this applies to the following description. On the other hand, in the case where the solid-state light-emitting device 11 is configured of a plurality of chips 11A, for example, as illustrated in FIGS. 6(B), 7(B), 9(B), and 10(B), the number of the light-emitting spots 11B is equal to the number of chips 11A. In this case, in the case where the solid-state light-emitting device 11 is configured of the single chip 11A, the size ($P_V \times P_H$) of the light emission region of the solid-state light-emitting device 11 is equal to the size ($P_{V1} \times P_{H1}$) of the light-emitting spot 11B. However, for example, as illustrated in FIGS. 8(C) and 11(C), in the case where the solid-state light-emitting device 11 has a monolithic configuration, the configuration is as described below, and this applies the following description. Namely, in an example in FIG. 8(C), the size ($P_V \times P_H$) of the light emission region of the solid-state light-emitting device 11 is larger than $P_{V1} \times 2P_{H1}$, and is smaller than $W_V \times W_H$. Moreover, in an example in FIG. 11(C), the size ($P_V \times P_H$) of the light emission region of the solid-state light-emitting device 11 is larger than $2P_{V1} \times P_{H1}$, and is smaller than $W_V \times W_H$. On the other hand, in the case where the solid-state light-emitting device 11 is configured of a plurality of chips 11A, the size ($P_V \times P_H$) of the light emission region of the solid-state light-emitting device 11 is equal to the size of a smallest possible enclosure containing the light-emitting spots 11B of all of the chips 11A. In the case where the plurality of chips 11A are arranged in a line in the transverse direction, in an example in FIG. 6(B), the size ($P_V \times P_H$) of the light emission region is larger than $P_{V1} \times 3P_{H1}$, and is smaller than $W_V \times W_H$. Likewise, in an example in FIG. 7(B), the size ($P_V \times P_H$) of the light emission region is larger than $P_{V1} \times 2P_{H1}$, and is smaller than $W_V \times W_H$. Moreover, in the case where the plurality of chips 11A are arranged in a line in the longitudinal direction, in an example in FIG. 9(B), the size ($P_V \times P_H$) of the light emission region is larger than $3P_{V1} \times P_{H1}$, and is smaller than $W_V \times W_H$. Likewise, in an example in FIG. 10(B), the size ($P_V \times P_H$) of the light emission region is larger than $2P_{V1} \times P_{H1}$, and is smaller than $W_V \times W_H$.

(Coupling Lens 20A, 20B, and 20C)

For example, as illustrated in FIG. 1, the coupling lens 20A may be configured to convert light emitted from the light source 10A into substantially parallel light, and to change a directivity angle of the light emitted from the light source 10A to be equal to or close to a directivity angle of parallel light. The coupling lens 20A is disposed in a position where light within the directivity angle of the light emitted from the light source 10A enters. For example, as illustrated in FIG. 1, the coupling lens 20B may be configured to convert light emitted from the light source 10B into substantially parallel light, and to change a directivity angle of the light emitted from the light source 10B to be equal to or close to the directivity angle of parallel light. The coupling lens 20B is disposed in a position where light within the directivity angle of the light emitted from the light source 10B enters. For example, as illustrated in FIG. 1, the coupling lens 20C may be configured to convert light emitted from the light source 10C into substantially parallel light, and to change a directivity angle of the light emitted from the light source 10C to be equal to or close to the directivity angle of parallel light. The coupling lens 20C is disposed in a position where light within the directivity angle of the light emitted from the light source 10C enters. In other words, the coupling lenses 20A, 20B, and 20C are disposed for the light sources 10A, 10B, and 10C, respectively (for respective packages). It is to be noted that each of the coupling lenses 20A, 20B, and 20C may be configured of a single lens, or a plurality of lenses.

Each of the dichroic mirrors 30A and 30B includes one mirror having wavelength selectivity. It is to be noted that, for example, the above-described mirror is formed through evaporating a multilayer interference film. For example, as illustrated in FIG. 1, the dichroic mirror 30A allows light incident from a back side of the mirror (light incident from the light source 10A) to pass toward a front side of the mirror, and reflects light incident from the front side of the mirror (light incident from the light source 10B) by the mirror. On the other hand, as illustrated in FIG. 1, the dichroic mirror 30B allows light incident from a back side of the mirror (light of the light sources 10A and 10B incident from the dichroic mirror 30A) to pass to a front side of the mirror, and reflects light incident from the front side of the mirror (light incident from the light source 10C) by the mirror. Therefore, the optical path combining device 30 is configured to combine respective light fluxes emitted from the light sources 10A, 10B, and 10C into a single light flux.

Figure 12:
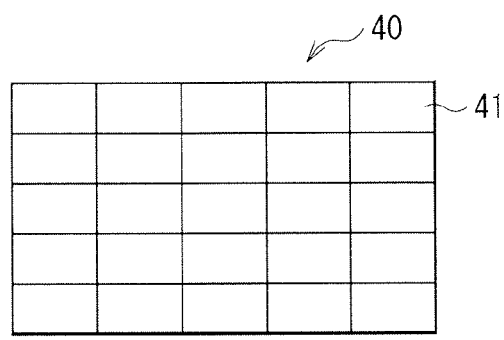
FIG. 12 is a diagram illustrating a schematic configuration example of a fly-eye lens illustrated in FIG. 1.

For example, as illustrated in FIG. 12, the integrator (fly-eye lens) 40 is configured of a plurality of cells each of which is configured of a lens arranged in a predetermined arrangement (in this case, a matrix of 5 (vertical)×5 (horizontal)). In other words, the cells 41 (unit cells) in the integrator 40 are arranged along respective arrangement directions, that is, the transverse direction (the X-axis direction) and the longitudinal direction (the Y-axis direction) orthogonal to each other. This integrator 40 allows light fluxes formed by separating the single light flux by the fly-eye lens to be focused, thereby forming a secondary light source plane (a light source image). The secondary light source plane is located on a plane conjugate to an entrance pupil of the projection optical system 70. However, the secondary light source plane is not necessarily precisely located on the plane conjugate to the entrance pupil of the projection optical system 70, and may be located within a design allowable region.

Now, in general, each of light fluxes emitted from the light sources 10A, 10B, and 10C have a nonuniform intensity distribution (luminance distribution) on a plane perpendicular to a traveling direction thereof. Therefore, when these light fluxes are directly guided to the illumination region 60A (the illuminated surface), an illuminance distribution (a luminance distribution) in the illumination region 60A becomes nonuniform. On the other hand, as described above, when light fluxes emitted from the light sources 10A, 10B, and 10C are separated by the integrator 40 into a plurality of light fluxes, and the plurality of light fluxes are guided to the illumination region 60A in a superimposed manner, the illuminance distribution on the illumination region 60A is allowed to become uniform (nonuniformity of the illumination distribution is allowed to be reduced).

The condenser lens 50 is configured to condense the light fluxes, from light sources, formed by the integrator 40 to illuminate the illumination region 60A with the light fluxes in a superimposed manner.

[Configuration of Display Optical System]

The polarizing beam splitter 51 is disposed on an optical path between the illumination optical system 1A (the condenser lens 50) and the reflective liquid crystal device 60. The polarizing beam splitter 51 is an optical member that selectively allows specific polarized light (for example, P-polarized light) to pass therethrough and selectively reflects the other polarized light (for example, S-polarized light). Therefore, light incident from the illumination optical system 1A (for example, S-polarized light) is selectively reflected by the polarizing beam splitter 51 to enter the reflective liquid crystal device 60.

(Reflective Liquid Crystal Device 60)

The reflective liquid crystal device 60 is configured to two-dimensionally modulate light fluxes from the illumination optical system 1A, based on color image signals (input image signals) corresponding to respective wavelength components of the light sources 10, 10B, and 10C, thereby generating image light. The reflective liquid crystal device 60 may be configured of a liquid crystal panel using, for example, a TN (Twisted Nematic) type liquid crystal (liquid crystal molecules having positive refractive index anisotropy). More specifically, The reflective liquid crystal device 60 has a configuration in which, in each of a plurality of pixels (not illustrated) arranged in a matrix, a liquid crystal layer (not illustrated) using the TN mode liquid crystal is sandwiched between a pair of substrates (not illustrated) to which a drive voltage based on an image signal is applied.

In this reflective liquid crystal device 60, in a case where the above-described TN type liquid crystal is used, light modulation is performed as follows under no drive voltage application and under drive voltage application.

First, when no drive voltage is applied (in white display that will be described later), the reflective liquid crystal device 60 has a characteristic in which the reflective liquid crystal device 60 provides a phase difference in an incident surface to incident light (image light) by twisted alignment to rotate a polarization axis of the incident light by about 90°, thereby emitting resultant light. In other words, under no drive voltage application, the reflective liquid crystal device 60 performs light modulation while reflecting light to allow light incident thereon and light exiting therefrom to have different polarization states (for example, S-polarization and P-polarization).

On the other hand, when the drive voltage is applied (in black display that will be described later), the reflective liquid crystal device 60 has a characteristic in which the reflective liquid crystal device 60 does not provide a phase difference in the incident surface to incident light (image light) by aligning liquid crystal molecules in a thickness direction of the reflective liquid crystal device 60, and emits the light while keeping the polarization axis of the light. In other words, under drive voltage application, the reflective liquid crystal device 60 performs light modulation while reflecting light to allow light incident thereon and light exiting therefrom to have (keep) a same polarization state (for example, S-polarization or P-polarization).

Thus, polarization of image light emitted from the reflective liquid crystal device 60 is different between under no drive voltage application and under drive voltage application. When such polarization characteristics of the reflective liquid crystal device 60 and optical characteristics of the above-described polarizing beam splitter 51 are combined, as will be described later, white display or black display is allowed to be achieved in the projector 1.

Moreover, the reflective liquid crystal device 60 may be configured of, for example, a liquid crystal panel using not the above-described TN type liquid crystal, but a VA (Vertical Alignment) type liquid crystal (liquid crystal molecules having negative refractive index anisotropy). In this case, the reflective liquid crystal device 60 has a configuration in which a liquid crystal layer (not illustrated) using a VA mode liquid crystal is sandwiched between the above-described pair of substrates (not illustrated).

In the reflective liquid crystal device 60, in a case where the above-described VA type liquid crystal is used, light modulation is performed as follows under no drive voltage application and under drive voltage application.

First, when no drive voltage is applied (in black display that will be described later), the liquid crystal molecules are aligned substantially vertically (in the thickness direction of the reflective liquid crystal device 60). Therefore, the reflective liquid crystal device 60 has a characteristic in which the reflective liquid crystal device 60 does not provide a phase difference in the incident surface to the incident light (image light), and emits the light while keeping the polarization axis of the light. In other words, contrary to the case where the above-described TN type liquid crystal is used, under no drive voltage application, the reflective liquid crystal device 60 performs light modulation while reflecting light to allow light incident thereon and light exiting therefrom to have (keep) a same polarization state.

On the other hand, when the drive voltage is applied (in white display that will be described later), the liquid crystal molecules falls to be aligned substantially horizontally. Therefore, the reflective liquid crystal device 60 has a characteristic in which the reflective liquid crystal device 60 provides a phase difference in the incident surface to incident light (image light) to rotate a polarization axis of the incident light by about 90°, thereby emitting resultant light. In other words, even under drive voltage application, contrary to the case where the TN type liquid crystal is used, the liquid crystal device 60 performs light modulation while reflecting light to allow light incident thereon and light exiting therefrom to have different polarization states.

Thus, even in the case where the VA type liquid crystal is used, as with the case where the TN type liquid crystal is used, polarization of image light emitted from the reflective liquid crystal device 60 is different between under no drive voltage application and under drive voltage application. Therefore, even in this case, when polarization characteristics of the reflective liquid crystal device 60 and the optical characteristics of the above-described polarizing beam splitter 51 are combined, as will be described later, white display or black display is allowed to be achieved in the projector 1. However, as described above, the reflective liquid crystal device 60 using the TN type liquid crystal and the reflective liquid crystal device 60 using the VA type liquid crystal are in inverse relation to each other between under no drive voltage application and drive voltage application and between white display and black display under no drive voltage application and under drive voltage application.

It is to be noted that the reflective liquid crystal device 60 is not limited to the liquid crystal panel using the above-described TN type or the VA type liquid crystal, and may be configured of a liquid crystal panel using another mode liquid crystal. More specifically, for example, the reflective liquid crystal device 60 may be configured of a liquid crystal panel using a liquid crystal of a STN (Super Twisted Nematic) type, an IPS (In Plane Switching) type, an OCB (Optically Compensated Bend) type, an MVA (Multi domain Vertical Alignment) type, an ASM (Axially Symmetric aligned Micro-cell) type, or the like. Moreover, the reflective liquid crystal device 60 may be configured of a liquid crystal panel using a smectic liquid crystal (for example, a ferroelectric liquid crystal) other than a nematic liquid crystal.

The projection optical system 70 is disposed between the polarizing beam splitter 70 and the screen 2, and is configured to project, onto the screen 2, image light generated by the reflective liquid crystal device 60 and then being incident thereon through an optical path passing through the polarization compensation device 80 and the polarizing beam splitter 51. Such a projection optical system may be configured of, for example, one or more lenses (projection lenses).

(Polarization Compensation Device 80)

The polarization compensation device 80 is disposed on an optical path between the polarizing beam splitter 51 and the reflective liquid crystal device 60, and is a device that provides a phase difference to incident light to change a polarization state of the incident light. More specifically, first, the polarization compensation device 80 has a first surface (a light transmission surface closer to the polarization beam splitter 51) and a second surface (a light transmission surface closer to the reflective liquid crystal device 60) facing each other along the optical axis. Then, the polarization compensation device 80 provides a phase difference between absolute values that are opposite in polarity to each other and are substantially equal to each other at light incidence from the polarizing beam splitter 51 (the above-described first surface) (an incident direction d1) and at light incidence from the reflective liquid crystal device 60 (the above-described second surface) (an incident direction d2). In other words, the polarization compensation device 80 has phase difference characteristics independent on the incident direction of light (phase difference symmetry). Therefore, as will be described in detail later, leakage light to the projection optical system 70 in black display is allowed to be reduced by a total of a phase difference provided at light incidence from the polarizing beam splitter 51 in the polarization compensation device 80, a phase difference produced at light modulation in the reflective liquid crystal device 60, and a phase difference provided at light incidence from the reflective liquid crystal device 60 in the polarization compensation device 80.

Figure 13:
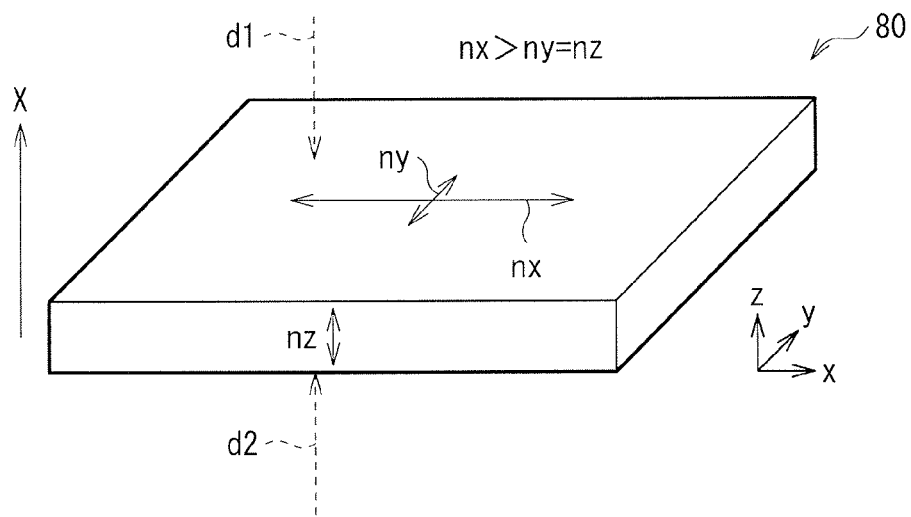
FIG. 13 is a schematic perspective view for describing refractive index anisotropy in a polarization compensation device illustrated in FIG. 1.

FIG. 13 schematically illustrates a configuration of such a polarization compensation device 80 in a perspective view. In this embodiment, as illustrated in FIG. 13, the polarization compensation device 80 is a plate-like device (a polarization compensation plate) with uniaxial refractive index anisotropy (positive birefringence anisotropy), and may be configured of an uniaxially stretched polymer film or the like as will be described later. Hereinafter, for convenience sake, in-plane directions in the polarization compensation device 80 are an x axis and a y axis, and a thickness direction in the polarization compensation device 80 is a z axis, and refractive indices in x-axis, y-axis, and z-axis directions in the polarization compensation device 80 are nx, ny, and nz, respectively. Thus, in the polarization compensation device 80, the following expression (1) is satisfied. In other words, in the in-plane directions, the refractive index nx in the x-axis direction (an stretching direction that will be described later) is relatively larger than the refractive index ny in the y-axis direction, and the refractive index nz in the z-axis direction (the thickness direction) is equal to the refractive index ny in the y-axis direction. Therefore, there is a characteristic that a phase of light incident on the polarization compensation device 80 is delayed (light travel speed is slowed down) in the x-axis direction, compared to that in the y-axis direction.

$$nx>ny=nz \qquad (1)$$

The polarization compensation device 80 with such refractive index anisotropy may be fabricated in the following manner, for example. Namely, for example, the polarization compensation device 80 with the refractive index anisotropy represented by the above-described expression (1) may be obtained by stretching a polymer film made of polycarbonate, a cyclic olefin-based resin or the like along one direction in a plane (uniaxially stretching the polymer film along the x-axis direction in this case).

It is to be noted that, since the polarization compensation device 80 is configured of a single polymer film uniaxially stretched in such a manner, the above-described phase difference symmetry is relatively easily achieved. On the other hand, for example, in general, a polarization compensation device that achieves desired phase difference characteristics by bonding a plurality of polymer films with different optical axes from one another does not have such phase difference symmetry. However, the polarization compensation device 80 with pseudo uniaxial refractive index anisotropy represented by the above-described expression (1) and phase difference symmetry may be fabricated with use of a product (a laminate film) formed by bonding the plurality of polymer films with different optical axes from one another. Thus, any product with phase difference symmetry may obtain a similar effect to that in the single uniaxially stretched polymer film.

Moreover, in this embodiment, an in-plane phase difference R0 provided in the polarization compensation device 80 is substantially 90° (for example, in a range of about 90°±5%) in a green wavelength region (for example, a wavelength region around 540 nm (about 520 nm to about 560 nm)). In other words, the polarization compensation device 80 is a ¼ wave plate (λ/4 plate) in which the in-plane phase difference R0 is substantially 90° in the green wavelength region.

Figure 14:
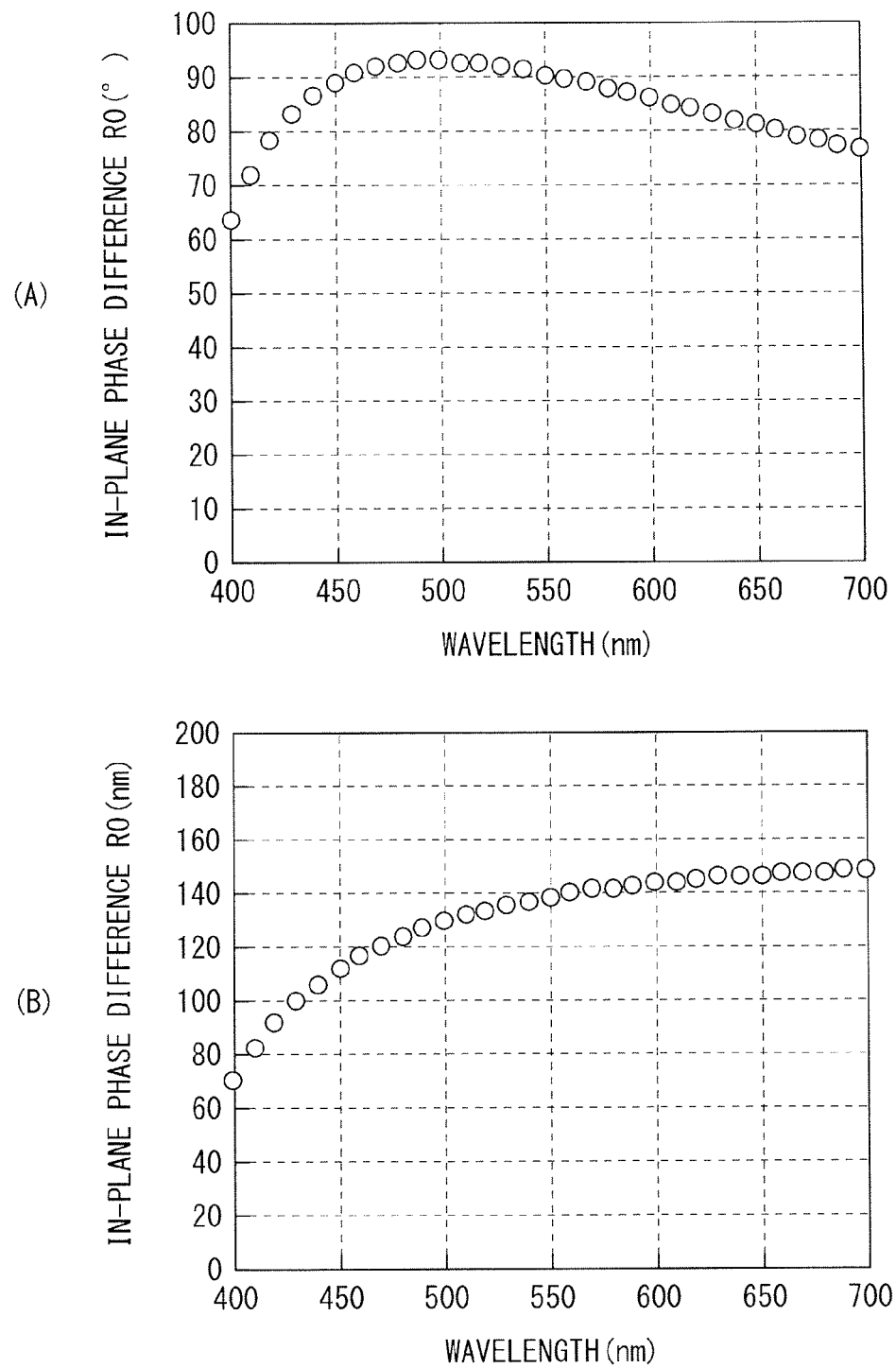
FIG. 14 is a diagram illustrating an example of wavelength dependence of a phase difference provided in the polarization compensation device illustrated in FIG. 1.

More specifically, the in-plane phase difference R0 in the polarization compensation device 80 may have the following wavelength dependence (a broadband ¼ wave plate), for example, as illustrated in FIG. 14(A).

Green wavelength region (a region around 540 nm) . . . R0(G)=about 90°

Blue wavelength region (a region around 440 nm) . . . R0(B)=in a range of about R0(G)±10%

Red wavelength region (a region around 640 nm) . . . R0(R)=in a range of about R0(G)±10%

Moreover, in other words, in this polarization compensation device 80, for example, as illustrated in FIG. 14(B), the in-plane phase difference R0(B) is R0(B)≈about 110 nm, the in-plane phase difference R0(G) is R0(G)≈about 140 nm, and the in-plane phase difference R0(R) is R0(R)≈about 150 nm. It is to be noted that a phase difference Rth in the thickness direction in the polarization compensation device 80 is about a half value of the in-plane phase difference R0.

It is to be noted that the in-plane phase difference R0 in the polarization compensation device 80 may have, for example, the following wavelength characteristics, instead of the wavelength characteristics illustrated in FIG. 14(A).

Green wavelength region (a region around 540 nm) . . . R0(G)=about 90°

Red wavelength region (a region around 640 nm) . . . R0(R)=in a range of about R0(G)±15%

Figure 15:
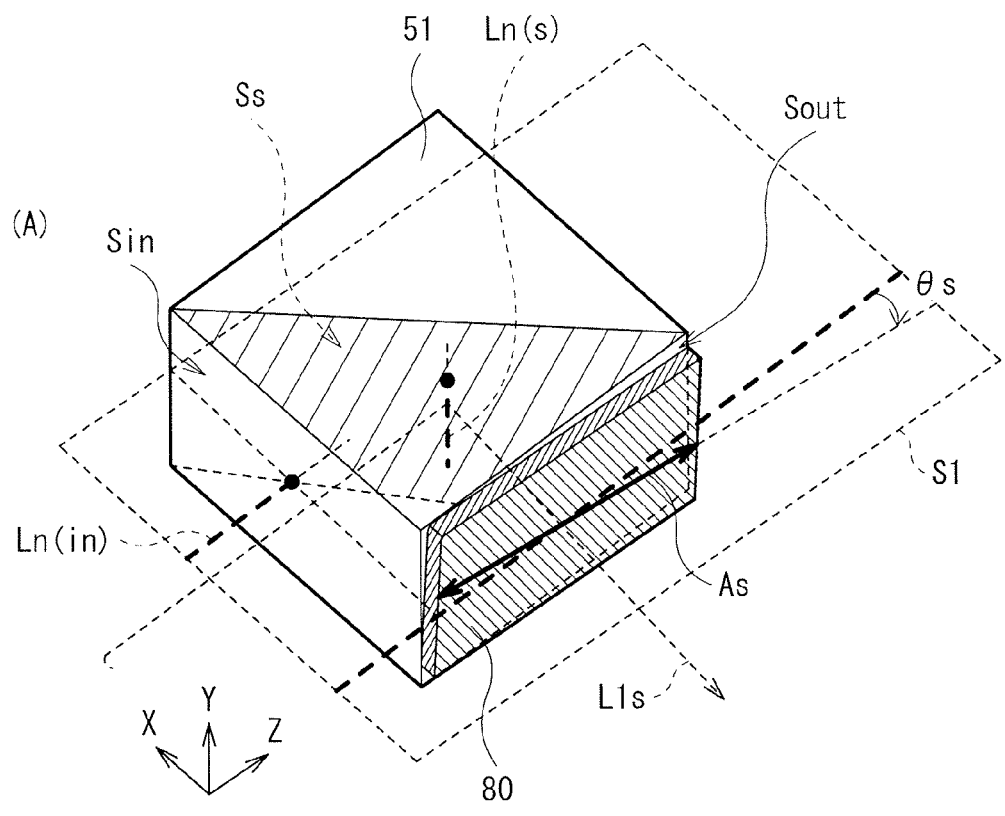
FIG. 15 is a schematic view for describing an example of a tilt angle when the polarization compensation device illustrated in FIG. 1 is provided.
Figure 15:
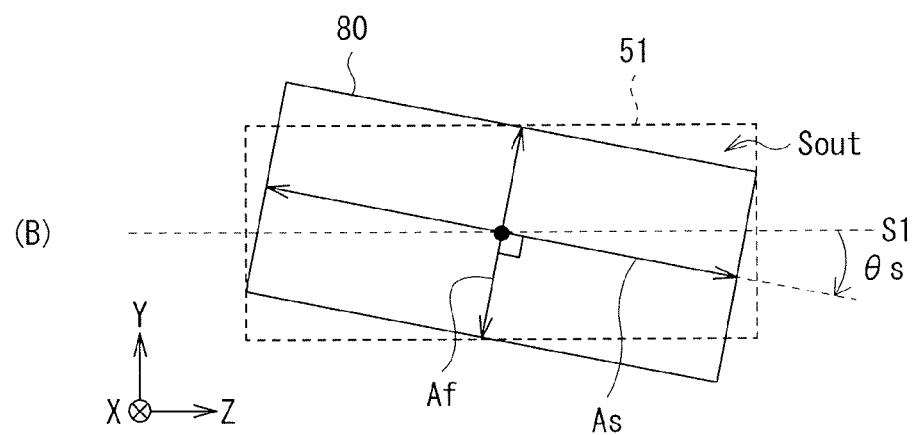

Further, in the polarization compensation device 80 of this embodiment, for example, as illustrated in FIGS. 15(A) and (B), an angle (a tilt angle θs) that a slow axis As of the polarization compensation device 80 forms with a predetermined plane S1 defined in the polarizing beam splitter 51 may have a value within a predetermined angle range. Herein, a plane including both a normal (herein, a normal Ln(in) of a light incident surface Sin is illustrated as an example) to light transmission surfaces (herein, the light incident surface Sin and a light emission surface Sout) in the polarizing beam splitter 51 and a normal Ln(s) to a polarization separation surface Ss in the polarizing beam splitter 51 is the above-described predetermined plane S1. Thus, in an example illustrated in FIGS. 15(A) and (B), the tilt angle θs that the slow axis As forms with such a plane S1 has a value within a predetermined angle range around 0° (for example, within a range of θs=0°±5°). It is to be noted that, in FIG. 15(A), entry and exit of S-polarized light L1s that will be described later are illustrated.

Figure 16:
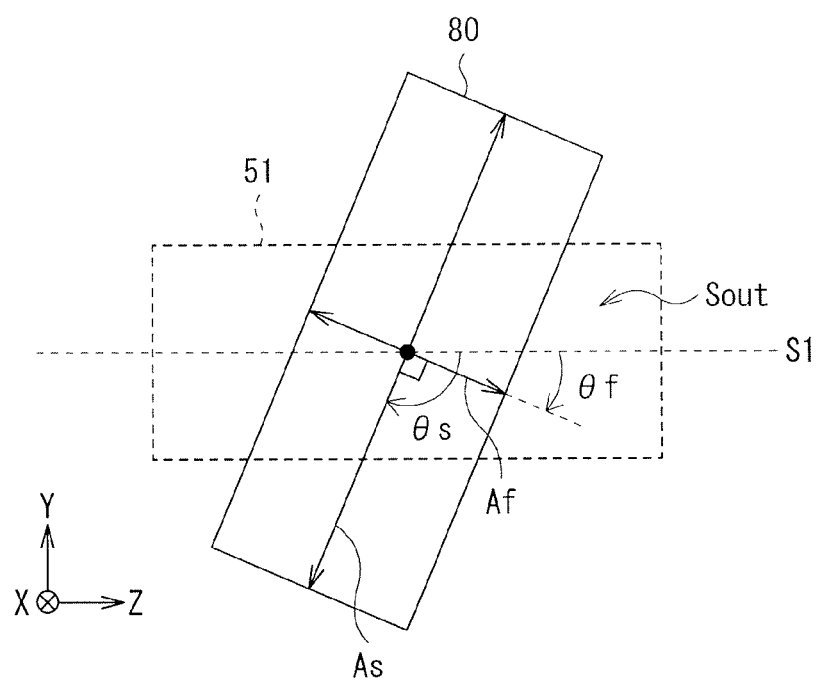
FIG. 16 is a schematic view for describing another example of the tilt angle when the polarization compensation device illustrated in FIG. 1 is provided.

Alternatively, in the polarization compensation device 80 of this embodiment, for example, as illustrated in FIG. 16, an angle (a tilt angle θf) that a fast axis Af of the polarization compensation device 80 forms with the above-described plane S1 may have a value within the above-described predetermined range. In other words, such a tilt angle θf may have a value within a predetermined angle range around 0° (for example, within a range of θf=0°±5°). Thus, to summarize the examples illustrated in FIGS. 15(A) and (B) and FIG. 16, the angle (the tilt angle θs or θf) that the slow axis As or the fast axis AF forms with the above-described predetermined plane S1 may have a value within the above-described predetermined angle range. In other words, it may be desirable that the tilt angle θs or the tilt angle θf have a value within the following range. Therefore, as will be described in detail in examples that will be described later, normalized contrast that will be described later may have, for example, a value of 3 or more (desirably 5 or more) in this predetermined angle range around 0°.

θs=a value within a range of 0°±5°

θf=a value within a range of 0°±5° (in other words, θs=a value within a range of) 90°±5°)

It is to be noted that the above-described "slow axis As" means an optical axis (herein, the above-described x-axis direction) with a relatively large refractive index (relatively slow light travel speed) in the in-plane direction of the polarization compensation device 80. Moreover, likewise, the "fast axis Af" means an optical axis (herein, the above-described y-axis direction) with a relatively small refractive index (relatively fast light travel speed) in the in-plane direction of the polarization compensation device 80.

[Actions and Effects of Projector 1]
(1. Basic Operation)

In this projector 1, light emitted from the respective light sources 10A, 10B, and 10C in the illumination optical system 1A is polarized and separated by the polarizing beam splitter 51, and one polarized light (for example, S-polarized light) of the light enters the reflective liquid crystal device 60 through the polarization compensation device 80. Moreover, this incident light is modulated by the reflective liquid crystal device 60, based on an image signal to generate image light, and this image light enters the projection optical system 70 through the polarization compensation device 80 and the polarizing beam splitter 51. Then, this incident light is projected onto the screen 2 by the projection optical system 70.

At this time, the light sources 10A, 10B, and 10C intermittently perform light emission with use of, for example, a predetermined light emission frequency. Thus, light of respective wavelength components (red light, green light, and blue light) is sequentially emitted in a time-divisional manner. Then, based on color image signals corresponding to the respective wavelength components (image signals of a red component, a green component, and a blue component), the reflective liquid crystal device 60 sequentially modulates light of corresponding colors in a time-divisional manner. Thus, a color image based on the image signals is displayed in the projector 1.

Figure 17:
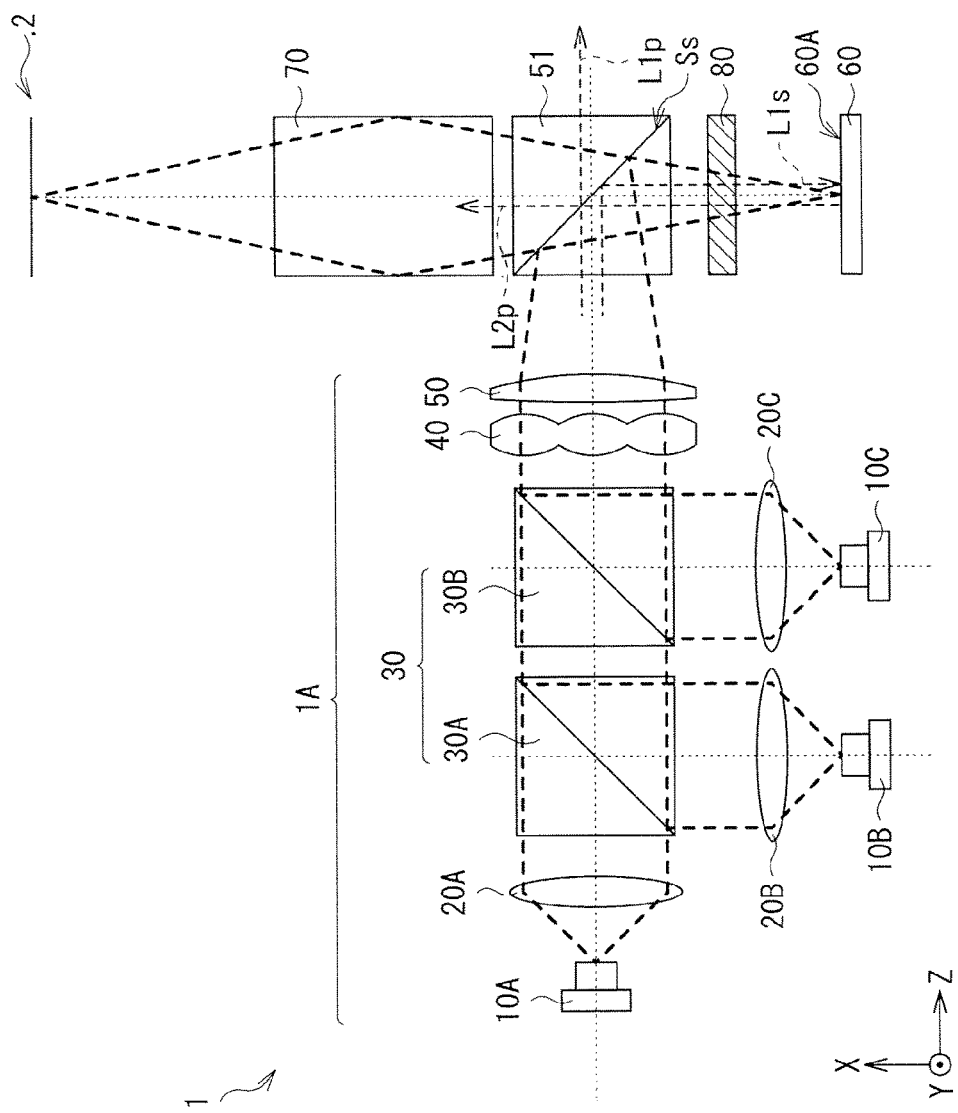
FIG. 17 is a diagram for describing an optical path of each polarized light in white display in the projector illustrated in FIG. 1.

In this case, white display may be performed, based on the image signals, for example, as illustrated in FIG. 17. More specifically, for example, P-polarized light L1p of light incident from the illumination optical system 1A to the polarizing beam splitter 51 may pass through the above-described polarization separation surface Ss as it is, and, for example, S-polarized light L1s of the incident light may be reflected by the polarization separation surface Ss to enter the reflective liquid crystal device 60. In this case, when the white display is performed, in the case where the TN type liquid crystal is used for the reflective liquid crystal device 60, a drive voltage is not applied, but in the case where the VA type liquid crystal is used for the reflective liquid crystal device 60, the drive voltage is applied. Therefore, even in either case where the TN type or VA type liquid crystal is used, as described above, image light that has been modulated and reflected by the reflective liquid crystal device 60 and has been emitted from the reflective liquid crystal device 60 is converted into P-polarized light (P-polarized light L2p). Therefore, image light is projected by allowing this P-polarized light L2p (image light) to pass through the polarization separation surface Ss of the polarizing beam splitter 51 and then be guided to the projection optical system 70. White display based on the image signals is performed in such a manner.

Figure 18:
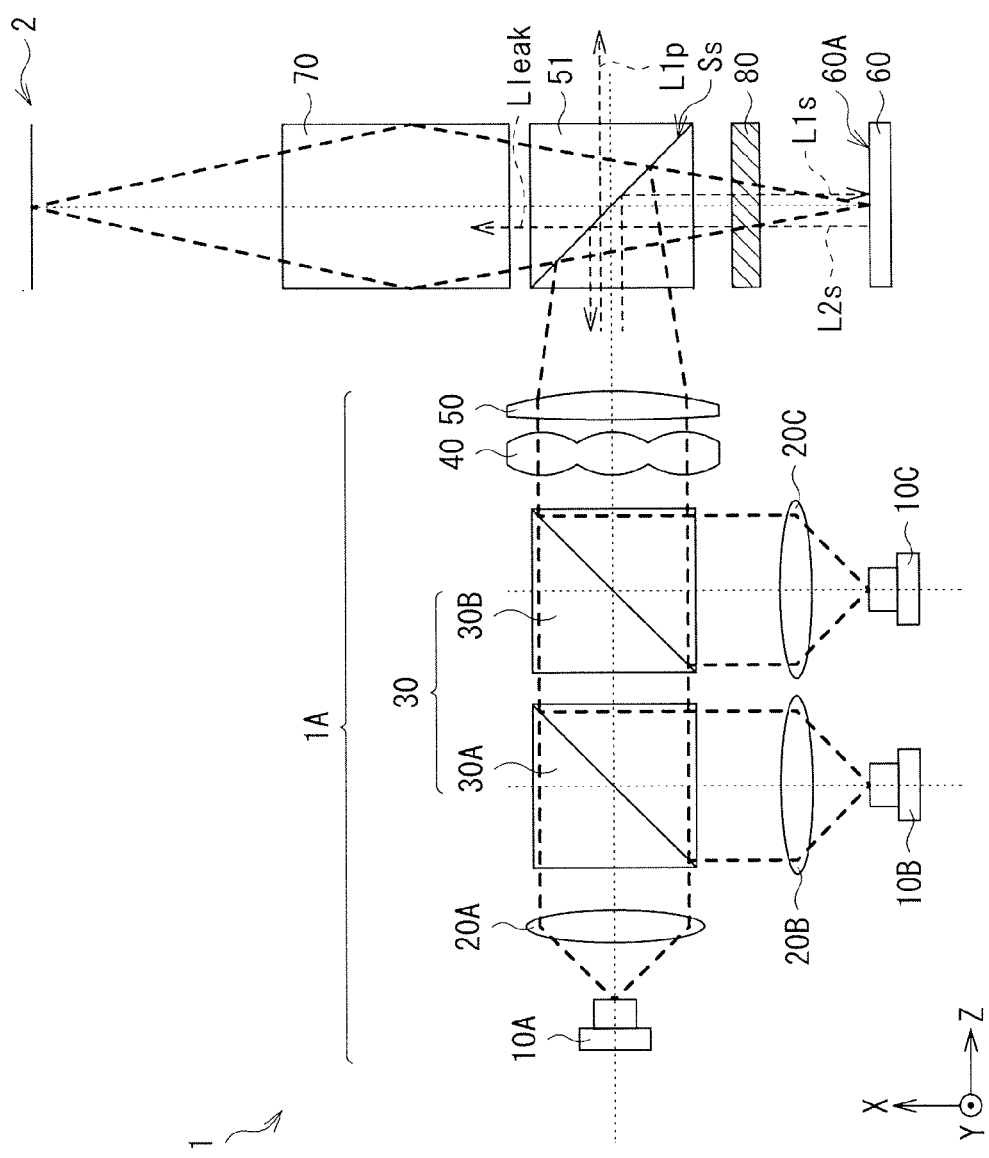
FIG. 18 is a diagram for describing an optical path of each polarized light in black display in the projector illustrated in FIG. 1.

On the other hand, black display may be performed, based on the image signals, for example, as illustrated in FIG. 18. More specifically, as with the above-described white display, for example, the P-polarized light L1p may pass through the polarization separation surface Ss, and, for example, the S-polarized L1s may be reflected by the polarization separation surface Ss to enter the reflective liquid crystal device 60. In this case, when the black display is performed, in the case where the TN type liquid crystal is used for the reflective liquid crystal device 60, a drive voltage is applied, but in the case where the VA type liquid crystal is used for the reflective liquid crystal device 60, the drive voltage is not applied. Therefore, in either case where the TN type or VA type liquid crystal is used, as described above, image light that has been modulated and reflected by the reflective liquid crystal device 60 and has been emitted from the reflective liquid crystal device 60 is kept in S-polarization (S-polarized light L2s). Therefore, this S-polarized light L2s is reflected by the polarization separation surface Ss of the polarizing beam splitter 51 to be returned to the illumination optical system 1A. In other words, in this case, the image light is not guided to the projection optical system 70; therefore, the image light is not projected. Black display based on the image signals is performed in such a manner.

(2. About Leakage Light in Black Display)

In such black display, in either case where the TN type or VA type liquid crystals is used for the reflective liquid crystal device 60, for example, as illustrated in FIG. 18, leakage light Lleak from the polarization beam splitter 51 to the projection optical system 70 may be generated. As described above, in black display, image light generated in the reflective liquid crystal device 60 is S-polarized light (the S-polarized light L2s); therefore, the image light is supposed to be fully reflected by the polarizing beam splitter 51, and the leakage light Lleak to the projection optical system 70 is supposed not to be generated.

However, since, for example, the S-polarized light L1s is light condensed by the condenser light 50, the S-polarized light L1s includes light of a component obliquely incident on the incident surface Sin of the polarizing beam splitter 51. Therefore, in the image light (the S-polarized light L2s) that is the reflected S-polarized light L1s, the leakage light Lleak is generated as follows. Namely, such obliquely incident light is seen as a polarized component rotated from an axis of ideal S-polarized light for the polarization separation surface Ss, and the image light actually includes an elliptically-polarized component. Therefore, since the image light includes the elliptically-polarized component, a part of the image light is not reflected by the polarization separation surface Ss and passes through the polarization separation surface Ss to generate the leakage light Lleak. Then, when such leakage light Lleak is generated, even in black display, a part of the image light is projected onto the screen 2; therefore, contrast is reduced, and display image quality is deteriorated.

2-1. Comparative Example 1

Figure 19:
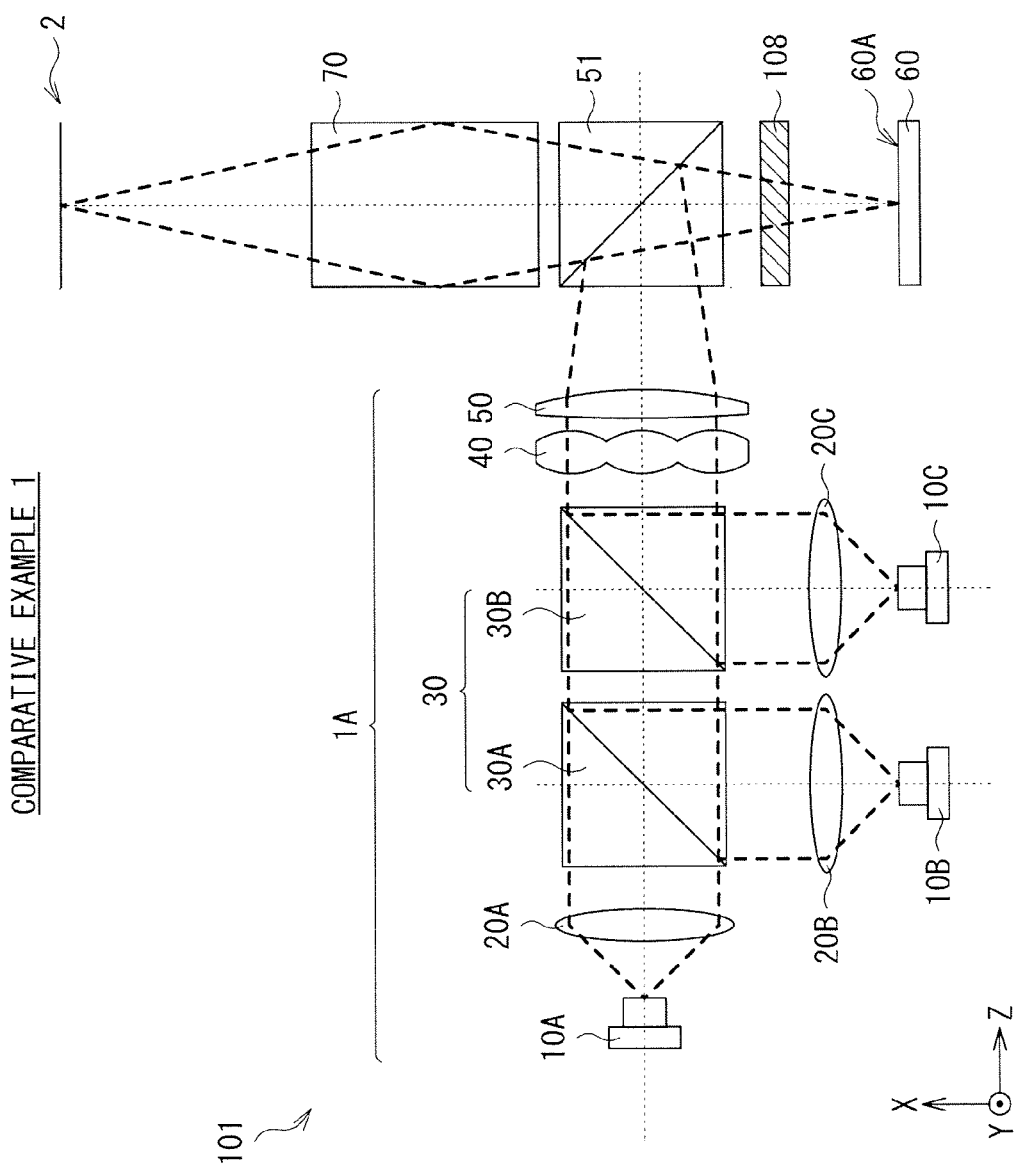
FIG. 19 is a diagram illustrating a schematic configuration of a projector according to Comparative Example 1.

In a projection liquid crystal display unit (a projector 101) according to Comparative Example 1 illustrated in FIG. 19, a typical ¼ wave plate 108 that does not have phase difference symmetry is disposed on an optical path between the polarizing beam splitter 51 and the reflective liquid crystal device 60. Accordingly, light emitted from the illumination optical system 1A passes through the ¼ wave plate 108 twice (twice by a round trip at incidence from the polarizing beam splitter 51 and at incidence from the reflective liquid crystal device 60); therefore, as a result, a similar effect to that in a case where light passes through a half-wave plate is obtained. In other words, linearly polarized light obtained by rotating a polarization axis of incident linearly polarized light by 90° is obtained. Thus, in the projector 101 of Modification Example 1, the leakage light Lleak in black display caused by elliptically-polarized light generated by the above-described obliquely incident light is reduced; therefore, luminance in the black display is suppressed, and contrast is improved to some extent.

However, even in the projector 101 of this Comparative Example 1, in a case where some of liquid crystal molecules remain tilted in the reflective liquid crystal device 60, the leakage light Lleak may be still generated in black display due to elliptically-polarized light generated by such remaining tilted liquid crystal molecules. More specifically, an extremely small phase difference is provided by the remaining tilted liquid crystal molecules to cause angle misalignment of a polarization axis in image light; therefore, the leakage light Lleak caused by such elliptically-polarized light is generated. Therefore, in a case where the ¼ wave plate 108 does not have phase difference characteristics (phase difference symmetry) independent on the incident direction of light (the ¼ wave plate 108 has phase difference characteristics dependent on the incident direction), leakage light in black display is not sufficiently suppressed, and an effect of improving contrast is not sufficient accordingly.

Moreover, since this projector 101 is a so-called single-chip liquid crystal projector, a wavelength region of light incident on the reflective liquid crystal device 60 is a wide visible region (a region from the blue wavelength region to the red wavelength region through the green wavelength region). Therefore, it is extremely difficult to reduce the leakage light Lleak in such a wide wavelength region by the ¼ wave plate 108.

2-2. Actions of Polarization Compensation Device 80

On the other hand, in the projector 1 of this embodiment, the polarization compensation device 80 provides a phase difference between absolute values that are opposite in polarity to each other and are substantially equal to each other at light incidence from the polarizing beam splitter 51 (the incident direction d1) and at light incidence from the reflective liquid crystal device 60 (the incident direction d2). In other words, the polarization compensation device 80 of this embodiment has phase difference characteristics (phase difference symmetry) independent on the incident direction of light, unlike the above-described ¼ wave plate 108 of Comparative Example 1. Therefore, the leakage light Lleak to the projection optical system 70 in black display is reduced by a total of a phase difference provided at light incidence from the polarizing beam splitter 51 in the polarization compensation device 80, a phase difference produced at light modulation in the reflective liquid crystal device 60, and a phase difference provided at light incidence from the reflective liquid crystal device 60 in the polarization compensation device 80.

Figure 20:
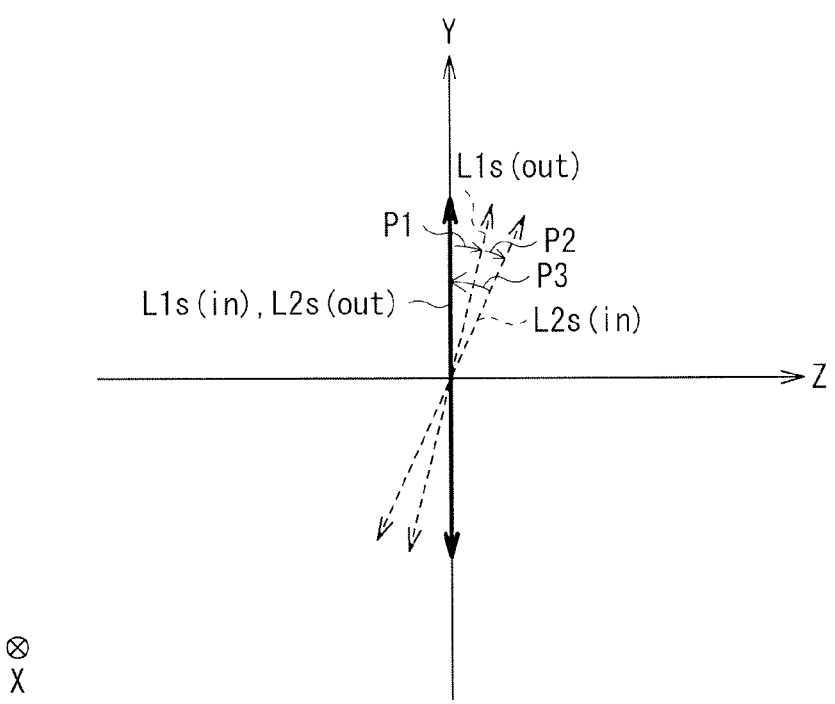
FIG. 20 is a schematic view for describing an action of reducing leakage light in black display.

Hereinafter, an action of reducing the leakage light Lleak in black display by the above-described total of the phase differences will be described in detail with use of, for example, a schematic view (a diagram schematically illustrating change in polarization state focused on one given light beam) illustrated in FIG. 20. First, when S-polarized light (S-polarized light L1s(in)) enters the polarization compensation device 80 from the polarizing beam splitter 51, this polarization compensation device 80 may provide, for example, a phase difference indicated by a rotation direction P1 in the diagram to the S-polarized light L1s(in), and then may emit S-polarized light L1s(out). Next, when the S-polarized light L1s(out) emitted from the polarization compensation device 80 is modulated and reflected by the reflective liquid crystal device 60, an extremely small phase difference (refer to a rotation direction P2 in the diagram) caused by the above-described remaining tilted liquid crystal molecules is provided to the S-polarized light L1s(out) to generate image light (S-polarized light L2s(in)). Then, when this image light (the S-polarized light L2s(in)) enters the polarization compensation device 80 again, a phase difference indicated by a rotation direction P3 that is an opposite direction (reverse polarity) to the above-described rotation directions P1 and 2 is provided to the S-polarized light L2s(in). When attention is focused on one given light beam, image light (the S-polarized light L2s(out)) emitted from the polarization compensation device 80 is converted into linearly polarized light with the same polarization axis as that of the original S-polarized light L1s(in). Therefore, when this image light (the S-polarized light L2s(out)) enters the polarizing beam splitter 51, the image light (the S-polarized light L2s(out)) is fully reflected by the polarization separation surface Ss to be returned to the illumination optical system 1A; therefore, generation of the leakage light Lleak to the projection optical system 70 is reduced or prevented.

Thus, in this embodiment, for example, even if obliquely incident light to the polarizing beam splitter 51 (the polarization separation surface Ss) is present or even if some of liquid crystal molecules remain tilted in the reflective liquid crystal device 60, the following occurs. Namely, the leakage light Lleak in black display from the polarizing beam splitter 51 to the projection system 70 caused by elliptically-polarized light generated by such obliquely incident light or such remaining tilted liquid crystal molecules is suppressed, and contrast is improved, compared to the above-described Comparative Example 1.

Moreover, in this embodiment, the in-plane phase difference R0 provided in the polarization compensation device 80 is substantially 90° (for example, within a range of about 90°±5%). More specifically, the in-plane phase difference R0 in the polarization compensation device 80 may have, for example, wavelength dependence (a broadband ¼ wave plate) described above referring to FIG. 14. Therefore, the leakage light Lleak is reduced in each wavelength region (a wide wavelength region), and contrast is more effectively improved.

Further, in this embodiment, the angle (the tilt angle θs or the tilt angle θf) that the slow axis As or the fast axis Af of the polarization compensation device 80 forms with the above-described predetermined plane S1 has a value within the predetermined angle range around 0° (for example, within a range of 0°±5°). Therefore, as will be described in the following examples, a further improvement in contrast is achieved (normalized contrast that will be described later may have, for example, a value of 3 or more (desirably 5 or more)).

Thus, in this embodiment, the polarization compensation device 80 provides a phase difference between absolute values that are opposite in polarity to each other and are substantially equal to each other at light incidence from the polarizing beam splitter 51 (the incident direction d1) and at light incidence from the reflective liquid crystal device 60 (the incident direction d2); therefore, the leakage light Lleak in black display caused by elliptically-polarized light generated by obliquely incident light or remaining tilted liquid crystal molecules is allowed to be suppressed. Therefore, contrast is allowed to be improved, and an improvement in display image quality is allowed to be achieved.

Furthermore, since the projector in this embodiment is a so-called single-chip liquid crystal projector, downsizing is easy, and a simple and low-priced configuration is allowed to be achieved.

Thus, in this embodiment, a small liquid crystal projector that has high image quality and is capable of being mounted in a small and lightweight electronic apparatus is allowed to be achieved.

EXAMPLES

Next, specific examples (Examples 1 to 6) of this embodiment will be described in detail below, compared to comparative examples (Comparative Examples 2 and 3).

Examples 1 to 3 and Comparative Example 2: TN Type Liquid Crystal

First, examples (Examples 1 to 3) and a comparative example (Comparative Example 2) in a case where the TN type liquid crystal was used for the reflective liquid crystal device 60 will be described below.

Figure 21:
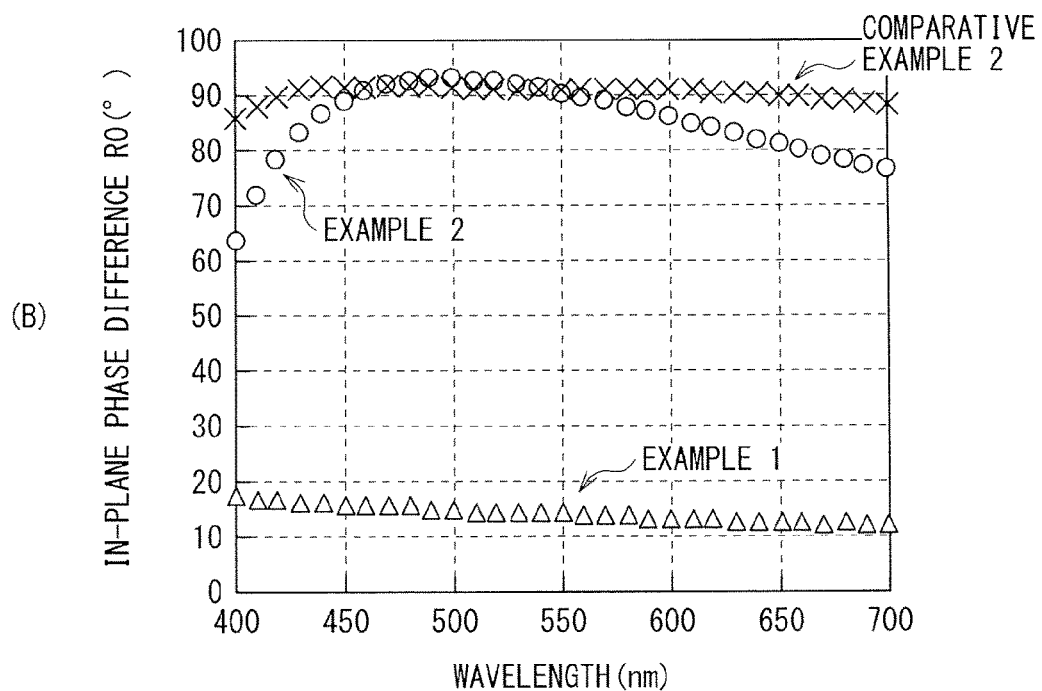
FIG. 21 is a diagram illustrating an example of configurations and effects according to Examples 1 to 3 and Comparative Example 2.

FIG. 21(A) illustrates examples of configurations and effects according to Examples 1 to 3 and Comparative Example 2 in a table, and FIG. 21(B) illustrates wavelength dependence of the in-plane phase difference R0 provided in respective polarization compensation devices of Examples 1 and 2 and Comparative Example 2. It is to be noted that the polarization compensation device 80 used in Example 3 was the same as the polarization compensation device 80 used in Example 2. However, in this Example 3, the polarization compensation device 80 was mounted to allow the tilt angles θs and θf to be different by about 90° from those in Example 2. On the other hand, the polarization compensation device used in Comparative Example 2 was fabricated by bonding a plurality of polymer films with different optical axes from one another, and had a desired value of the in-plane phase difference R0(G), but did not have phase difference symmetry.

Figure 22:
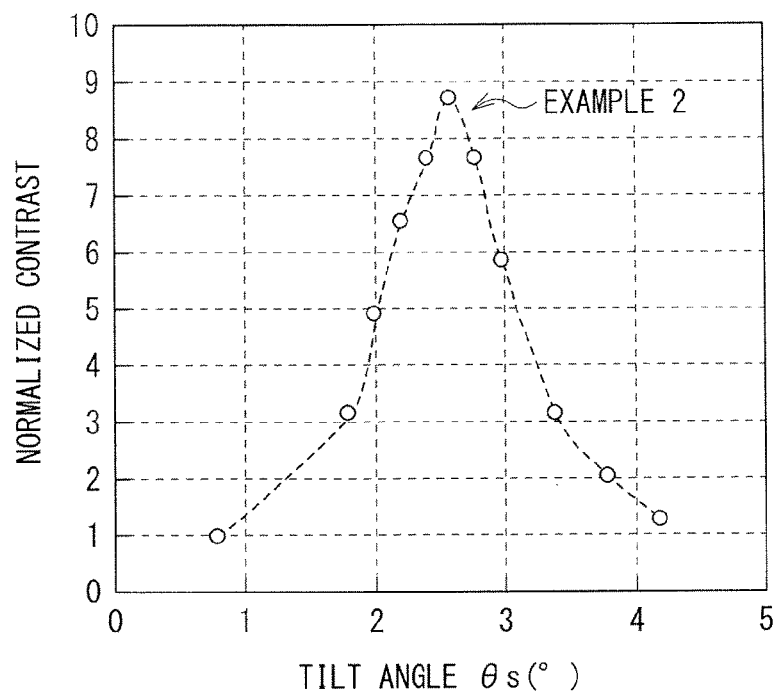
FIG. 22 is a diagram illustrating an example of a relationship between a tilt angle and normalized contrast in Example 2.

Moreover, FIG. 22 illustrates an example of a relationship between the tilt angle θs and normalized contrast in Example 2. It is to be noted that this normalized contrast is a parameter representing an improvement ratio of contrast in a case where the polarization compensation device is used to initial contrast in a case where the polarization compensation device is not used. More specifically, normalized contrast of larger than 1.0 means that, compared to the case where the polarization compensation device is not used, contrast is improved, and the larger the value is, the higher an improvement effect is.

First, as can be seen from FIGS. 21(A) and (B), in Examples 1 to 3 in which the polarization compensation device 80 had phase difference characteristics (phase difference symmetry) independent on the incident direction of light, compared to Comparative Example 2 in which the polarization compensation device 80 had phase difference asymmetry dependent on the incident direction of light, a contrast improvement effect was higher. More specifically, while, in Examples 1 to 3, the normalized contrast was larger than 1, and contrast was improved (Effect: a "double circle" mark, a "circle" mark, or a "triangle" mark), in Comparative Example 2, the normalized contrast was smaller than 1, and contrast was deteriorated (Effect: a "cross" mark), compared to a case where the polarization compensation device was not used.

Moreover, in Examples 2 and 3, the in-plane phase difference R0(G) was R0(G)≈90° (≈140 nm); therefore, it was found that, compared to Example 1 that did not have such a value, the value of the normalized contrast was larger, and a higher contrast improvement effect was obtained. More specifically, while, in Examples 2 and 3, the normalized contrast was 8.7 (Effect: a "double circle" mark) and 3.6 (Effect: a "circle" mark), respectively (normalized contrast had a value of 3 or more), in Example 1, the normalized contrast was 1.8 (Effect: a "triangle" mark).

Further, it was found that, in Example 2, the tilt angle θs had a value within a range of θs=0°±5°; therefore, compared to Example 3 in which the tilt angle θf had a value within a range of θf=0°±5° (the tilt angle θs had a value within a range of θs=90°±5°), in Example 2, the value of the normalized contrast was larger. Therefore, it is considered that the case where the angle (the tilt angle θs) that the slow axis As of the polarization compensation device 80 forms with the plane S1 has a value within the predetermined angle range around 0° may be more desirable than the case where the angle (the tilt angle θf) that the fast axis Af of the polarization compensation device 80 forms with the plane S1 has a value within the predetermined angle range around 0°. This is because a higher contrast improvement effect is obtained accordingly.

It is to be noted that, as can be seen from FIG. 22, in Example 2, it may be more desirable that the value of the tilt angle θs be within a range from about 2° to about 3° both inclusive. This is because, in this range, the value of the normalized contrast was abruptly increased (in this example, the normalized contrast had a value of 5 or more). Thus, it may be desirable that the normalized contrast have, for example a value of 3 or more (desirably, for example, 5 or more) in the case where the tilt angle θs or the tilt angle θf is within the above-described predetermined angle range around 0°.

Examples 4 to 6 and Comparative Example 3: VA Type Liquid Crystal

Next, examples (Examples 4 to 6) and a comparative example (Comparative Example 3) in a case where the VA type liquid crystal was used for the reflective liquid crystal device 60 will be described below.

Figures 23, 24:
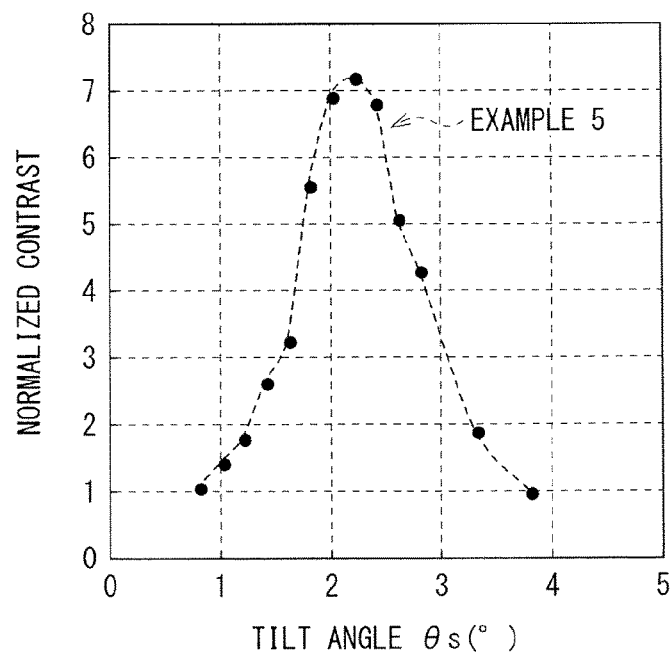
FIG. 23 is a diagram illustrating an example of configurations and effects according to Examples 4 to 6 and Comparative Example 3.
FIG. 24 is a diagram illustrating an example of a relationship between a tilt angle and normalized contrast in Example 5.

FIG. 23 illustrates examples of configurations and effects according to Examples 4 to 6 and Comparative Example 3 in a table. FIG. 24 illustrates an example of a relationship between the tilt angle θs and normalized contrast in Example 5. It is to be noted that the polarization compensation devices 80 used in Examples 4 to 6 were the same as the polarization compensation devices 80 used in Example 1 to 3, respectively, and the polarization compensation devices used in Comparative Examples 2 and 3 were the same as each other. Moreover, as with the above-described relationship between Examples 2 and 3, in Example 6, the polarization compensation device 80 was mounted to allow the tilt angles θs and θf to be different by about 90° from those in Example 5.

First, as can be seen from FIG. 23, in Examples 4 to 6 in which the polarization compensation device 80 had phase difference characteristics (phase difference symmetry) independent on the incident direction of light, compared to Comparative Example 3 in which the polarization compensation device 80 had phase difference asymmetry dependent on the incident direction of light, the contrast improvement effect was higher. More specifically, while, in Examples 4 to 6, the normalized contrast was larger than 1, and contrast was improved (Effect: a "double circle" mark, a "circle" mark, or a "triangle" mark), in Comparative Example 3, the normalized contrast was smaller than 1, and contrast was deteriorated (Effect: a "cross" mark), compared to the case where the polarization compensation device was not used.

Moreover, in Examples 5 and 6, the in-plane phase difference R0(G) was R0(G)≈90° (≈140 nm); therefore, it was found that, compared to Example 4 that did not have such a value, the value of the normalized contrast was larger, and a higher contrast improvement effect was obtained. More specifically, while, in Examples 5 and 6, the normalized contrast was 7.2 (Effect: a "double circle" mark) and 3.0 (Effect: a "circle" mark), respectively (normalized contrast had a value of 3 or more), in Example 4, the normalized contrast was 1.7 (Effect: a "triangle" mark).

Further, it was found that, in Example 5, the tilt angle θs had a value within a range of θs=0°±5°; therefore, compared to Example 6 in which the tilt angle θf had a value within a range of θf=0°±5° (the tilt angle θs had a value within a range of θs=90°±5°), in Example 5, the value of the normalized contrast was larger. Therefore, even in the case where the VA type liquid crystal was used for the reflective liquid crystal device 60, as with the case where the TN type liquid crystal was used, the following is considered. Namely, the case where the angle (the tilt angle θs) that the slow axis As of the polarization compensation device 80 forms with the plane S1 has a value within the predetermined angle range around 0° may be more desirable than the case where the angle (the tilt angle θf) that the fast axis Af of the polarization compensation device 80 forms with the plane S1 has a value within the predetermined angle range around 0°. This is because a higher contrast improvement effect is obtained accordingly.

It is to be noted that, as can be seen from FIG. 24, in Example 5, it may be more desirable that the value of the tilt angle θs be within a range from about 1.5° to about 3° both inclusive. This is because, in this range, the value of the normalized contrast was abruptly increased (in this example, the normalized contrast had a value of 5 or more). Thus, it may be desirable that the normalized contrast have, for example a value of 3 or more (desirably, for example, 5 or more) in the case where the tilt angle θs or the tilt angle θf is within the above-described predetermined angle range around 0°.

Summary of Examples 1 to 6

Thus, a cause (the leakage light Lleak in black display) of contrast deterioration is similar in either case where the TN type or the VA type liquid crystal is used for the reflective liquid crystal device 60; therefore, the following was confirmed. Namely, it was found that, when the same polarization compensation device 80 was used, a similar contrast improvement effect was obtained in both of the cases.

It is to be noted that, in general, there is a characteristic that, compared to the case where the TN type liquid crystal is used, in the case where the VA type liquid crystal is used, initial contrast (when the polarization compensation device 80 is not provided) is higher. Therefore, in these Examples 1 to 6, compared to Examples 1 to 3 (in the case where the TN type liquid crystal was used), in Examples 4 to 6 (in the case where the VA type liquid crystal was used), about 1.5 times higher contrast was obtained. On the other hand, for example, in Example 2 (in the case where the TN type liquid crystal was used), normalized contrast had a larger value than that in Example 5 (in the case where the VA type liquid crystal was used). This is because, in the case of the TN type liquid crystal in which the initial contrast has a relatively low value, a higher contrast improvement effect is obtained by providing the polarization compensation device 80. However, final contrast in a combination of the VA type liquid crystal and the polarization compensation device 80 (Examples 4 to 6) had an about 1.3 times higher value than that in a combination of the TN type liquid crystal and the polarization compensation device 80 (Examples 1 to 3), and higher image quality was obtained in the combination of the VA type liquid crystal and the polarization compensation device 80 (Examples 4 to 6).

Modification Examples

Next, modification examples (Modification Examples 1 and 2) of the above-described embodiment will be described below. It is to be noted that like components are denoted by like numerals as of the embodiment, and will not be further described.

Modification Example 1

Figure 25:
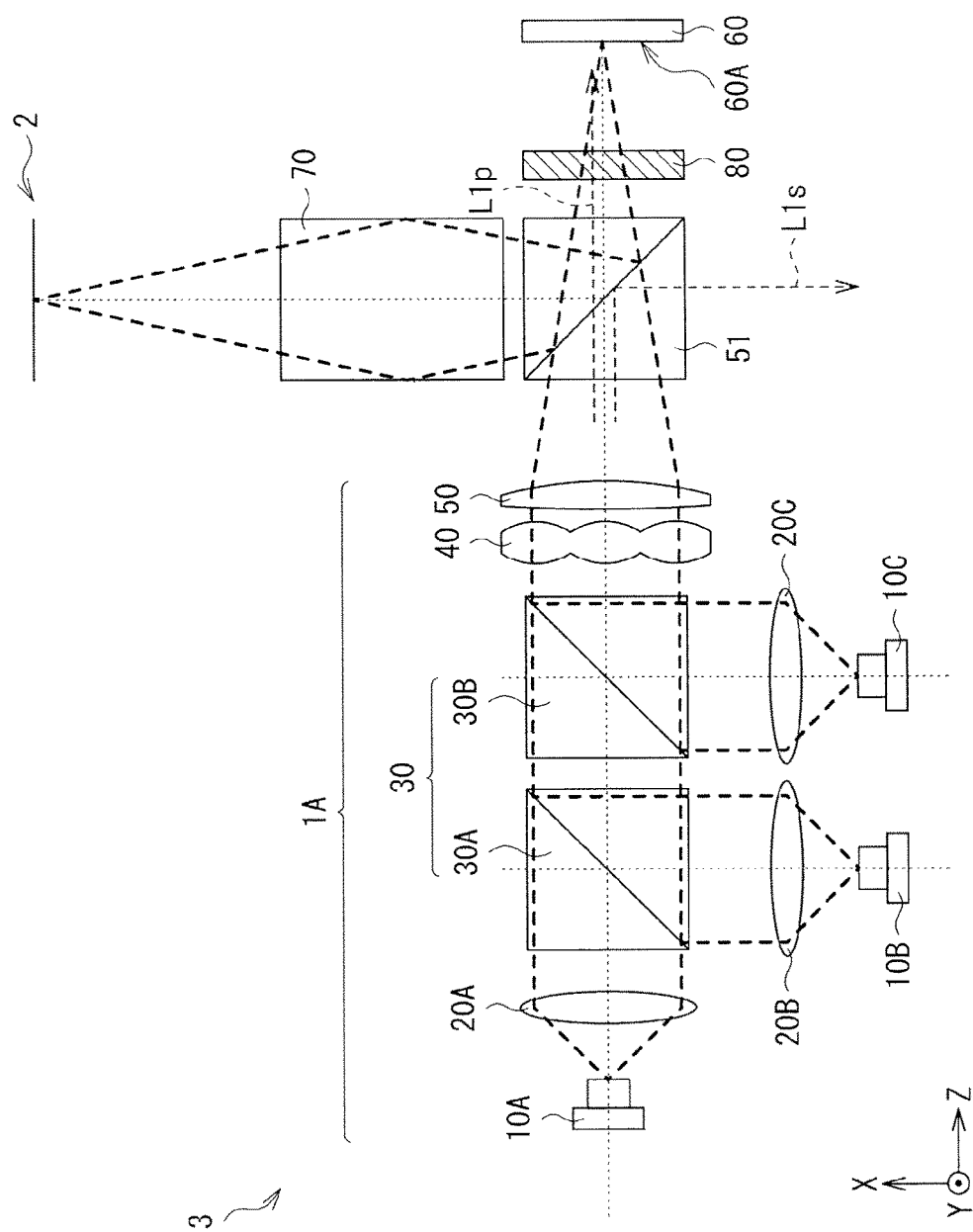
FIG. 25 is a diagram illustrating a schematic configuration of a projector according to Modification Example 1.

FIG. 25 illustrates a schematic configuration of a projection display unit (a projector 3) according to Modification Example 1 with an optical path (indicated by a thick broken line) and an optical axis (indicated by a thin broken line). The projector 3 of this modification example has a similar configuration to that of the projector 1, except that positions of the reflective display device 60 and the polarization compensation device 80 are changed.

More specifically, in this projector 3, as illustrated in FIG. 25, contrary to the projector 1, the P-polarized light L1p of light incident from the illumination optical system 1A to the polarizing beam splitter 51 passes through the polarization separation surface Ss as it is to enter the reflective liquid crystal device 60 through the polarization compensation device 80. On the other hand, the S-polarized light L1s is reflected by the polarization separation surface Ss, thereby not contributing to generation of image light.

Therefore, in this modification example, an action of reducing the leakage light Lleak similar to that performed on the S-polarized light L1s in the above-described embodiment is performed on the P-polarized light L1p incident from the polarizing beam splitter 51 in such a manner. In other words, the leakage light Lleak to the projection optical system 70 in black display is reduced by a total of a phase difference provided at light incidence from the polarizing beam splitter 51 in the polarization compensation device 80, a phase difference produced at light modulation in the reflective liquid crystal device 60, and a phase difference provided at light incidence from the reflective liquid crystal device 60 in the polarization compensation device 80.

Even the projector 3 of this modification example with such a configuration is allowed to obtain similar effects to those of the projector 1 of the above-described embodiment by a similar action to that of the projector 1.

Modification Example 2

Figure 26:
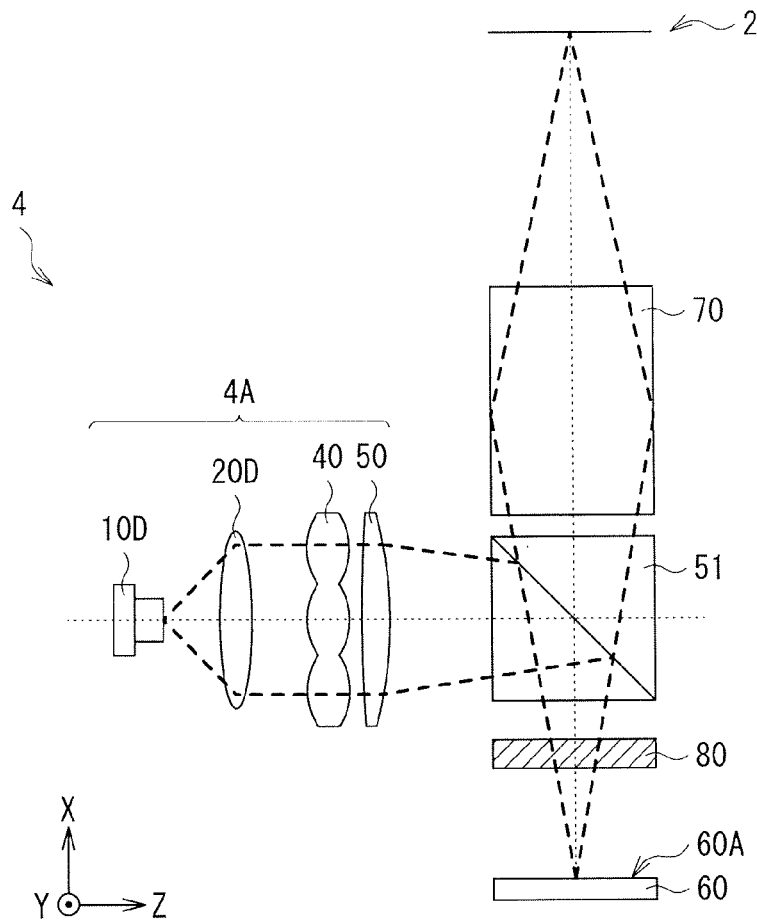
FIG. 26 is a diagram illustrating a schematic configuration of a projector according to Modification Example 2.

FIG. 26 illustrates a schematic configuration of a projection display unit (a projector 4) according to Modification Example 2 with an optical path (indicated by a thick broken line) and an optical axis (indicated by a thin broken line). The projector 4 of this modification example has a similar configuration to that of the projector 1 of the above-described embodiment, except that, instead of the illumination optical system 1A, an illumination optical system 4A is provided.

The illumination optical system 4A is different from the illumination optical system 1A provided with a plurality of (three) light sources 10A, 10B, and 10C in that only one light source 10D is provided, and the dichroic mirrors 30A and 30B are removed. The light source 10D is disposed on an optical axis of a coupling lens 20D, and in the illumination optical system 4A, light emitted from the light source 10D directly enters the integrator 40 through the coupling lens 20D.

Thus, even the projector 4 of this modification example in which only one light source 10D is provided in the illumination optical system 4A is allowed to obtain similar effects to those of the projector 1 of the above-described embodiment by a similar action to that of the projector 1.

It is to be noted that, even in this modification example, as with the above-described Modification Example 1, the positions of the reflective display device 60 and the polarization compensation device 80 may be changed. Even in this case, this modification example is allowed to obtain similar effects to those of the projector 1 of the above-described embodiment by a similar action to that of the projector 1.

Other Modification Examples

Although the technology of the present disclosure is described referring to the embodiment and the modification examples, this technology is not limited thereto, and various modifications are possible.

For example, in the above-described embodiment and the like, each of the illumination optical systems 1A and 4A is configured to include an infinite optical system that allows parallel light to enter the integrator (the fly-eye lens) 40; however, each of the illumination optical systems 1A and 4A may be configured to include a finite optical system that allows convergent light (or divergent light) to enter the integrator 40. In this case, in the above-described embodiment and the like, instead of the coupling lenses 20A to 20D, a coupling lens (a directivity angle changing device) having a function of converging or diverging light emitted from the light sources 10A to 10D may be provided.

Moreover, a combination of any of configurations of characteristics parts in the respective illumination optical systems and the respective projectors described in the above-described embodiment and the like may be included.

Figure 27:
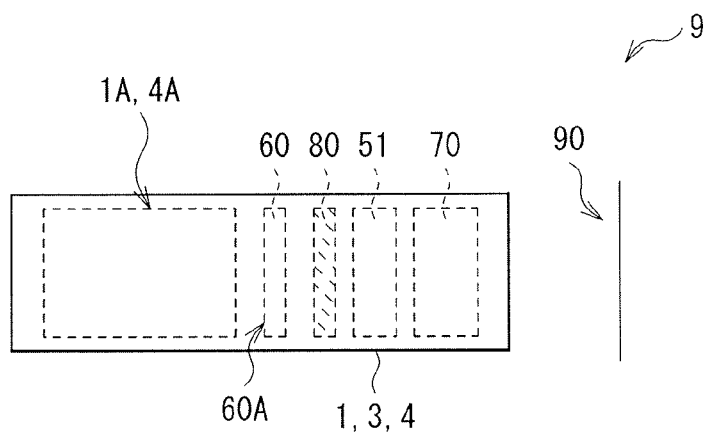

Further, in the above-described embodiment and the like, a case where this technology is applied to the projection display unit (projector) is described; however, this technology is also applicable to any other display units. For example, as illustrated in FIG. 27, this technology is applicable to a direct-view display unit (a rear-projection display unit 9). The rear-projection display unit 9 includes any of the projectors 1, 3, 4, and the like including any of the illumination optical systems 1A and 4A (or a combination of any of them) and a transmissive screen 90 that displays image light projected from the projector 1, 3, 4, or the like (the projection optical system 70). Even the rear-projection display unit 9 is allowed to obtain similar effects to those of the projectors 1, 3, and 4 of the above-described embodiment and the like by a similar action to that in the projectors 1, 3, and 4.

In addition, in the above-described embodiment and the like, respective components (optical systems) of the illumination optical system and the display unit are specifically described; however, it is not necessary to include all of the components, or other components may be further included.

It is to be noted that this technology may have the following confirmations.

(1) A projection display unit including:
an illumination optical system including one or more light sources;
a reflective liquid crystal device that generates image light by modulating light from the illumination optical system, based on an input image signal;
a polarizing beam splitter disposed on an optical path between the illumination optical system and the reflective liquid crystal device;
a polarization compensation device disposed on an optical path between the polarizing beam splitter and the reflective liquid crystal device, and the polarization compensation device that provides a phase difference to light incident thereon to change a polarization state of the light; and
a projection optical system that projects image light generated by the reflective liquid crystal device and then being incident thereon through an optical path, the optical path passing through the polarization compensation device and the polarizing beam splitter,
in which the polarization compensation device has a first surface and a second surface that faces each other along an optical axis, and provides a phase difference between absolute values at light incidence from the first surface and at light incidence from the second surface, the absolute values being opposite in polarity to each other and being substantially equal to each other.

(2) The projection display unit according to (1), in which the polarization compensation device is a plate-like device having uniaxial refractive index anisotropy, and
(nx>ny=nz) is satisfied, where refractive indices in in-plane directions of the polarization compensation device are nx and ny, and a refractive index in a thickness direction of the polarization compensation device is nz.

(3) The projection display unit according to (2), in which an angle that a slow axis or a fast axis in the polarization compensation device forms with a plane including both a normal to a light transmission surface in the polarizing beam splitter and a normal to a polarization separation surface in the polarizing beam splitter has a value within a predetermined angle range around 0°.

(4) The projection display unit according to (3), in which normalized contrast has a value of 3 or more within the predetermined angle range around 0°.

(5) The projection display unit according to (3) or (4), in which the angle that the slow axis forms with the plane has a value within the predetermined angle range around 0°.

(6) The projection display unit according to any one of (2) to (5), in which the polarization compensation device is configured of a single polymer film uniaxially stretched, or a laminate film configured by bonding a plurality of polymer films with different optical axes from one another.

(7) The projection display unit according to any one of (1) to (6), in which an in-plane phase difference provided in the polarization compensation device is substantially 90° in a green wavelength region.

(8) The projection display unit according to any one of (1) to (7), in which
the first surface is a surface closer to the polarizing beam splitter, and
the second surface is a surface closer to the reflective liquid crystal device.

(9) The projection display unit according to (8), in which leakage light to the projection optical system in black display is reduced by a total of a phase difference provided at light incidence from the polarizing beam splitter in the polarization compensation device, a phase difference produced at light modulation in the reflective liquid crystal device, and a phase difference provided at light incidence from the reflective liquid crystal device in the polarization compensation device.

(10) The projection display unit according to any one of (1) to (9), in which the reflective liquid crystal device is configured with use of a VA (Vertical Alignment) type or TN (Twisted Nematic) type liquid crystal.

(11) The projection display unit according to any one of (1) to (10), in which the light source is formed in a manner of a package incorporating a solid-state light-emitting device or a package in which the solid-state light-emitting device is supported on a base.

(12) The projection display unit according to any one of (1) to (11), in which one or more of the one or more light sources is configured with use of a laser diode.

(13) A direct-view display unit including:
an illumination optical system including one or more light sources;
a reflective liquid crystal device that generates image light by modulating light from the illumination optical system, based on an input image signal;
a polarizing beam splitter disposed on an optical path between the illumination optical system and the reflective liquid crystal device;
a polarization compensation device disposed on an optical path between the polarizing beam splitter and the reflective liquid crystal device, and the polarization compensation device that provides a phase difference to light incident thereon to change a polarization state of the light;
a projection optical system that projects image light generated by the reflective liquid crystal device and then being incident thereon through an optical path, the optical path passing through the polarization compensation device and the polarizing beam splitter; and
a transmissive screen that displays the image light projected from the projection optical system,
in which the polarization compensation device has a first surface and a second surface that faces each other along an optical axis, and provides a phase difference between absolute values at light incidence from the first surface and at light incidence from the second surface, the absolute values being opposite in polarity to each other and being substantially equal to each other.

The present disclosure contains subject matter related to that disclosed in Japanese Priority Patent Application No. 2013-4376 filed in the Japan Patent Office on Jan. 15, 2013 and Japanese Priority Patent Application No. 2013-135041 filed in the Japan Patent Office on Jun. 27, 2013, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display unit comprising:
an illumination optical system including one or more light sources;
a reflective liquid crystal device that generates image light by modulating light from the illumination optical system, based on an input image signal;
a polarizing beam splitter disposed on an optical path between the illumination optical system and the reflective liquid crystal device;
a polarization compensation device disposed on an optical path between the polarizing beam splitter and the reflective liquid crystal device, wherein the polarization compensation device provides a phase difference to light incident thereon to change a polarization state of the light; and
a projection optical system that projects image light generated by the reflective liquid crystal device and then being incident thereon through an optical path, the optical path passing through the polarization compensation device and the polarizing beam splitter,
wherein the polarization compensation device has a first surface and a second surface that face each other along an optical axis, and provides a first phase difference to light incident on the first surface and a second phase difference to light incident on the second surface, the first phase difference and the second phase difference being opposite in polarity to each other and being substantially equal in magnitude to each other.

2. The projection display unit according to claim 1, wherein the polarization compensation device is a plate-like device having uniaxial refractive index anisotropy, and (nx>ny=nz) is satisfied, where refractive indices in in-plane directions of the polarization compensation device are nx and ny, and a refractive index in a thickness direction of the polarization compensation device is nz.

3. The projection display unit according to claim 2, wherein an angle that a slow axis or a fast axis in the polarization compensation device forms with a plane including both a normal to a light transmission surface in the polarizing beam splitter and a normal to a polarization separation surface in the polarizing beam splitter has a value within a predetermined angle range around 0°.

4. The projection display unit according to claim 3, wherein a normalized contrast produced by the polarization compensation device has a value of 3 or more within the predetermined angle range around 0°.

5. The projection display unit according to claim 3, wherein the angle that the slow axis forms with the plane has a value within the predetermined angle range around 0°.

6. The projection display unit according to claim 2, wherein the polarization compensation device is configured of a single polymer film uniaxially stretched, or a laminate film configured by bonding a plurality of polymer films with different optical axes from one another.

7. The projection display unit according to claim 1, wherein an in-plane phase difference provided in the polarization compensation device is substantially 90° in a green wavelength region.

8. The projection display unit according to claim 1, wherein the first surface is a surface closer to the polarizing beam splitter, and the second surface is a surface closer to the reflective liquid crystal device.

9. The projection display unit according to claim 8, wherein leakage light to the projection optical system in black display is reduced based on a total of a phase difference provided at light incidence from the polarizing beam splitter in the polarization compensation device, a phase difference produced at light modulation in the reflective liquid crystal device, and a phase difference provided at light incidence from the reflective liquid crystal device in the polarization compensation device.

10. The projection display unit according to claim 1, wherein the reflective liquid crystal device is configured with use of a VA (Vertical Alignment) type or TN (Twisted Nematic) type liquid crystal.

11. The projection display unit according to claim 1, wherein the light source is formed in a manner of a package incorporating a solid-state light-emitting device or a package in which the solid-state light-emitting device is supported on a base.

12. The projection display unit according to claim 1, wherein one or more of the one or more light sources is configured with use of a laser diode.

13. A direct-view display unit comprising:
an illumination optical system including one or more light sources;
a reflective liquid crystal device that generates image light by modulating light from the illumination optical system, based on an input image signal;
a polarizing beam splitter disposed on an optical path between the illumination optical system and the reflective liquid crystal device;
a polarization compensation device disposed on an optical path between the polarizing beam splitter and the reflective liquid crystal device, wherein the polarization compensation device provides a phase difference to light incident thereon to change a polarization state of the light;
a projection optical system that projects image light generated by the reflective liquid crystal device and then being incident thereon through an optical path, the optical path passing through the polarization compensation device and the polarizing beam splitter; and
a transmissive screen that displays the image light projected from the projection optical system,
wherein the polarization compensation device has a first surface and a second surface that face each other along an optical axis, and provides a first phase difference to light incident on the first surface and a second phase difference to light incident on the second surface, the first phase difference and the second phase difference being opposite in polarity to each other and being substantially equal in magnitude to each other.

* * * * *